(12) United States Patent
Agrawal et al.

(10) Patent No.: US 12,189,676 B2
(45) Date of Patent: Jan. 7, 2025

(54) INTENT-BASED COPYPASTA FILTERING

(71) Applicant: Microsoft Technology Licensing, LLC, Redmond, WA (US)

(72) Inventors: Shilpi Agrawal, Bengaluru (IN); Sumit Srivastava, Bengaluru (IN); Ashish Tripathy, Bengaluru (IN); Grace W. Tang, Los Altos, CA (US); Hitesh Manwani, Bengaluru (IN)

(73) Assignee: Microsoft Technology Licensing, LLC, Redmond, WA (US)

( * ) Notice: Subject to any disclaimer, the term of this patent is extended or adjusted under 35 U.S.C. 154(b) by 5 days.

(21) Appl. No.: 18/158,416

(22) Filed: Jan. 23, 2023

(65) Prior Publication Data

US 2024/0248926 A1    Jul. 25, 2024

(51) Int. Cl.
*G06F 16/435* (2019.01)
*G06F 16/45* (2019.01)

(52) U.S. Cl.
CPC ............ *G06F 16/435* (2019.01); *G06F 16/45* (2019.01)

(58) Field of Classification Search
CPC ............................... G06F 16/435; G06F 16/45
See application file for complete search history.

(56) References Cited

U.S. PATENT DOCUMENTS

2016/0259859 A1* 9/2016 Sathish .............. G06F 16/9535
2020/0320978 A1* 10/2020 Chatterjee ........... G10L 15/1822

OTHER PUBLICATIONS

"Copypasta", Retrieved From: https://en.wikipedia.org/wiki/Copypasta#:~:text=A%20copypasta%20is%20a%20block,users%20and%20disrupt%20online%20discourse, Dec. 14, 2022, 3 Pages.

* cited by examiner

*Primary Examiner* — Jared M Bibbee
(74) *Attorney, Agent, or Firm* — NICHOLSON DE VOS WEBSTER & ELLIOTT LLP

(57) ABSTRACT

Embodiments of copypasta filtering system technologies cluster digital content items into copypasta clusters, extract a first feature set from the digital content items in the copypasta clusters, apply a first set of filters to the first feature set, and based on output of the first set of filters, divide the copypasta clusters into first intent copypasta clusters and possible second intent copypasta clusters. A second feature set is extracted from the digital content items in the possible second intent copypasta clusters. A second set of filters is applied to the second feature set. Based on output of the second set of filters, second intent copypasta clusters are created.

20 Claims, 8 Drawing Sheets

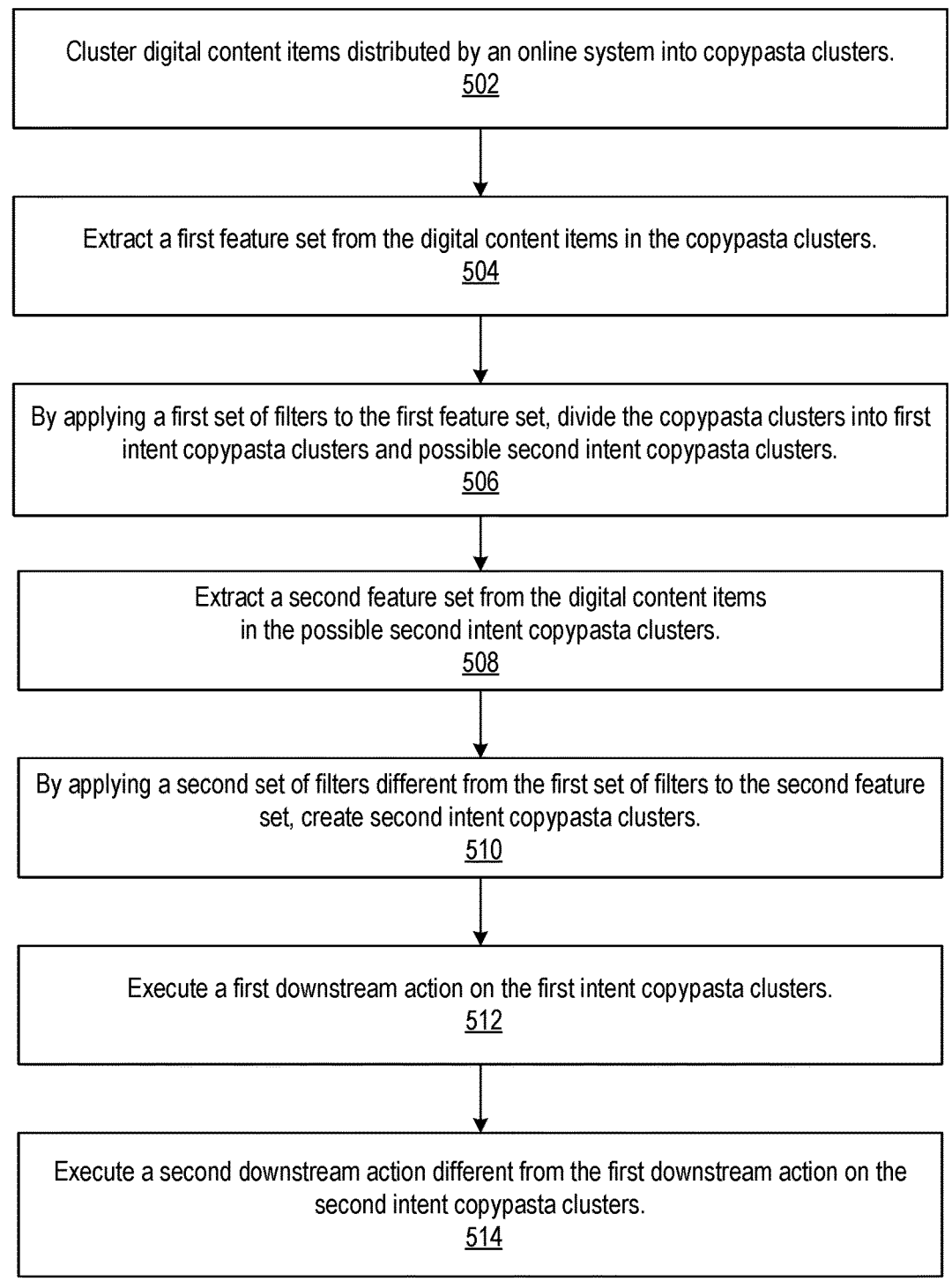

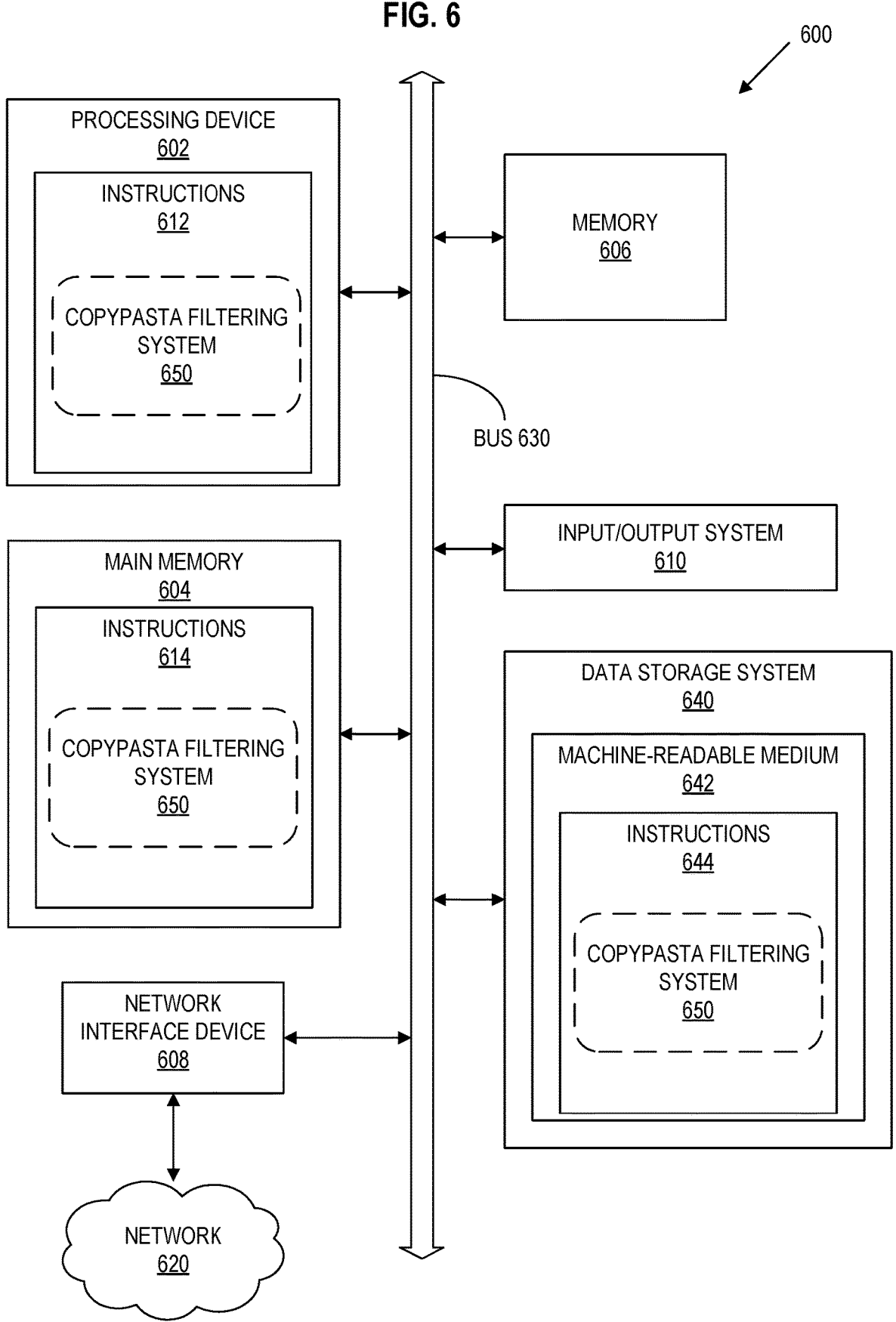

INTENT-BASED COPYPASTA FILTERING

TECHNICAL FIELD

A technical field to which the present disclosure relates is digital content distribution through online systems. Another technical field to which the present disclosure relates is copypasta detection in digital content distribution.

BACKGROUND

Software applications can use computer networks to distribute digital content among computing devices on a very large scale. Online software applications can regularly receive and distribute millions of content items to hundreds of millions of user devices worldwide, every day. The content items received and distributed by online software applications can include text, images, audio, video, and combinations of different forms of digital content.

BRIEF DESCRIPTION OF THE DRAWINGS

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 5 is a flow diagram of an example method 500 for filtering copypasta in accordance with some embodiments of the present disclosure.

FIG. 6 is a block diagram of an example computer system 600 including a copypasta filtering system 650 in accordance with some embodiments of the present disclosure.

DETAILED DESCRIPTION

Figure 1:
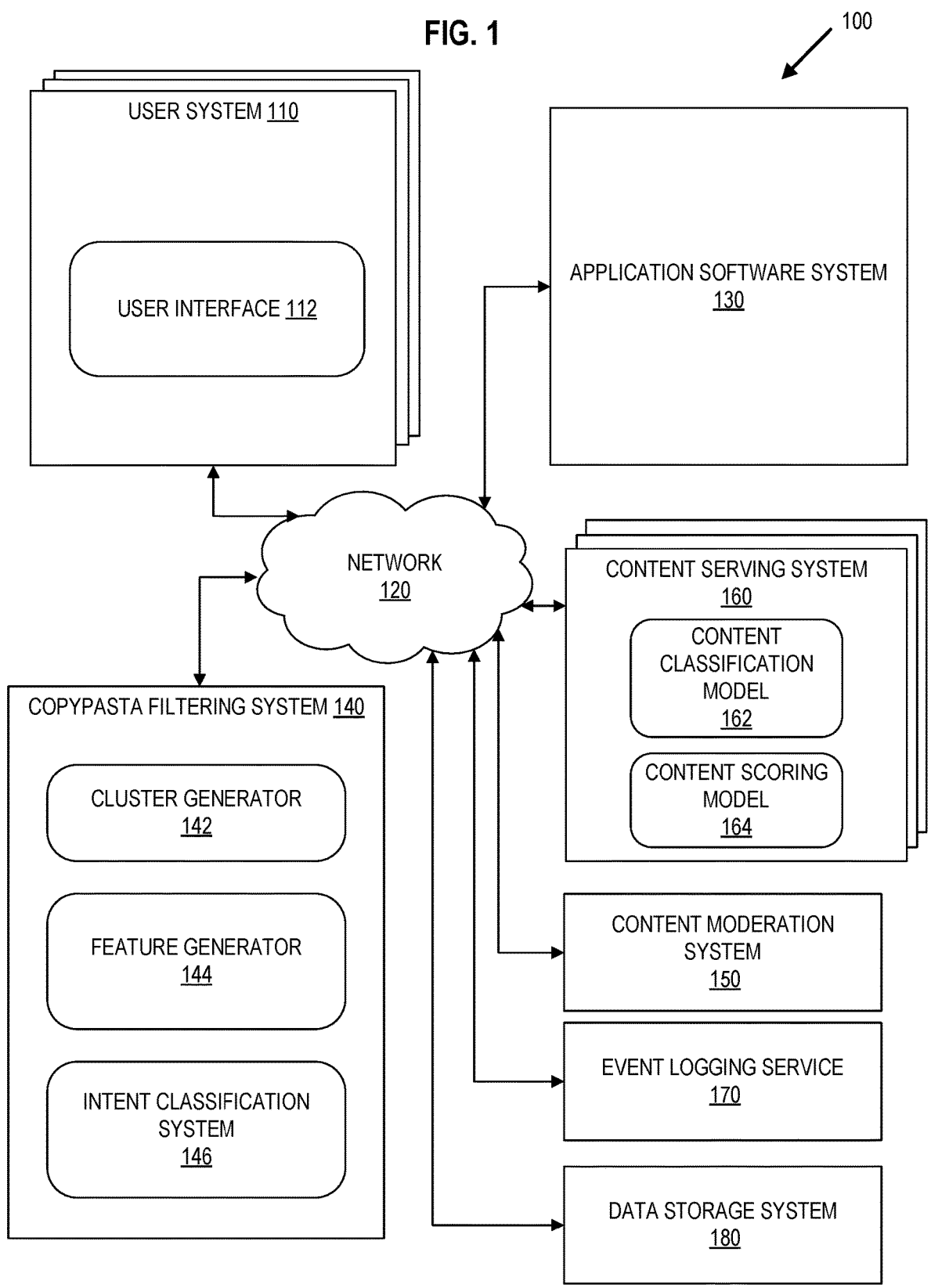
FIG. 1 illustrates an example computing system 100 that includes a copypasta filtering system in accordance with some embodiments of the present disclosure.

Copypasta is digital content that is reproduced, e.g., copied and pasted, across the Internet by users through, for example, online forums and social networking websites. Like spam, copypasta can be disruptive to online systems because it is annoying to other users, disrupts online discourse, and strains computing resources. FIG. 4B and FIG. 4C illustrate examples of disruptive copypasta. In FIG. 4B, a copypasta cluster 420 includes two different content items 422, 424 that each have been posted to an online system by two different users of the online system. The content item 422 is an original post that contains advice or opinion content. The content item 422 has gone viral as it has gained over two thousand reactions and almost two hundred comments. The content item 424 is considered disruptive copypasta that should be filtered out because it contains an exact copy of the text of the original post content item 422 but does not have any connection to the author of the original post content item 422. Because there is no connection between the content item 424 and the original post content item 422, the content item 424 is considered disruptive because it is ingenuine, inauthentic, or has been posted with the intent of capitalizing on the virality of the original post content item 422.

In FIG. 4C, a copypasta cluster 440 includes two different content items 442, 444 that each have been posted to an online system by two different users of the online system. In the example of FIG. 4C, the content item 444 is an original post that contains motivational content. The content item 444 has obtained a substantial number of reactions and shares even if not enough to be considered viral. The content item 442 contains an exact copy of the motivational content of the content item 444. The content item 442 is considered disruptive copypasta that should be filtered out because it contains an exact copy of the motivational text of the original content item 444 and does not give attribution to author of the content item 444. Because of the lack of connection to the original post content item 422, the content item 424 is considered disruptive as ingenuine, inauthentic, or having been posted with the intent of capitalizing on the motivational quality of the original post content item 444.

In view of the often detrimental impact of copypasta such as content item 424 and content item 442 on online systems, conventional copypasta filters have been modeled after spam filters, which seek to filter out all instances of detected spam from online distribution.

Conventional copypasta filters that operate in a similar way as spam filters are effective against disruptive copypasta such as content item 424 and content item 442. However, not all copypasta is disruptive. Some copypasta are non-disruptive and should not be filtered out.

Figure 4A:
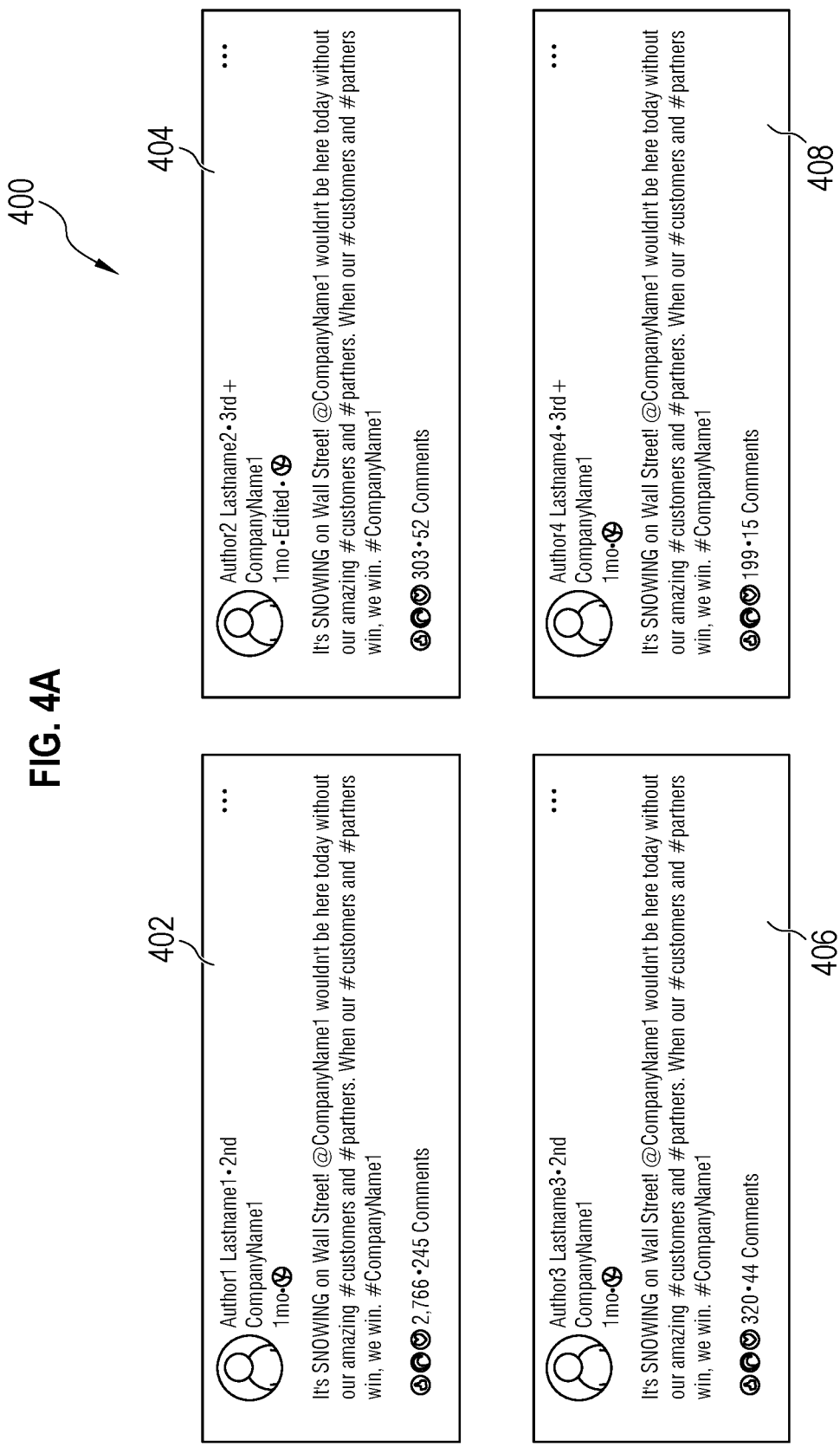
FIG. 4A illustrates example screen captures of copypasta content items 402, 404, 406, 408 in accordance with some embodiments of the present disclosure.
Figure 4B:
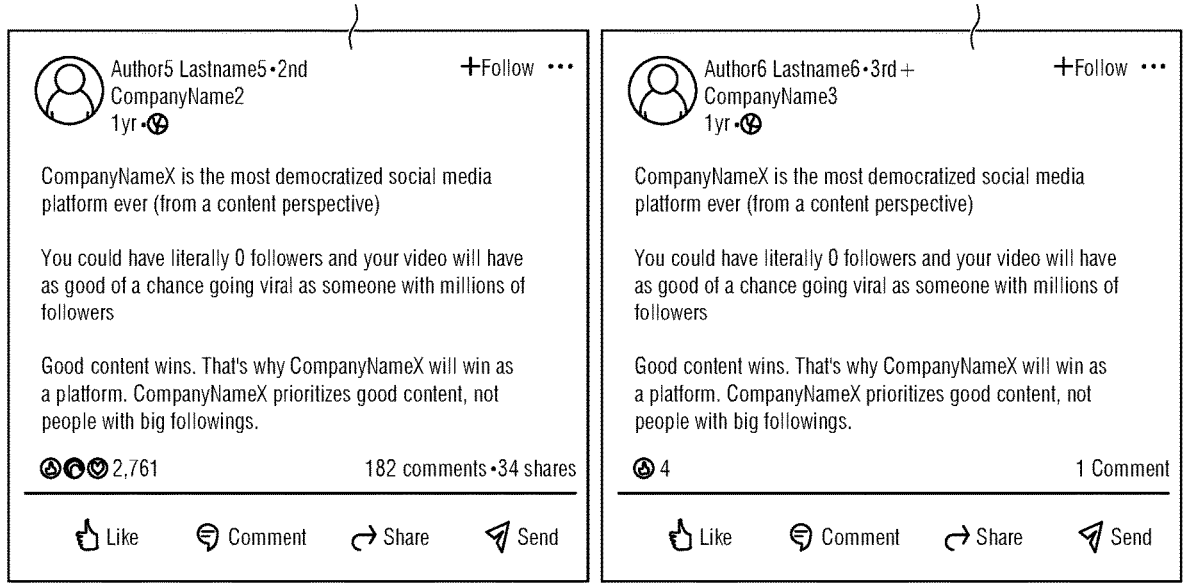
FIG. 4B illustrates example screen captures of copypasta content items 422, 424 in accordance with some embodiments of the present disclosure.
Figure 4C:
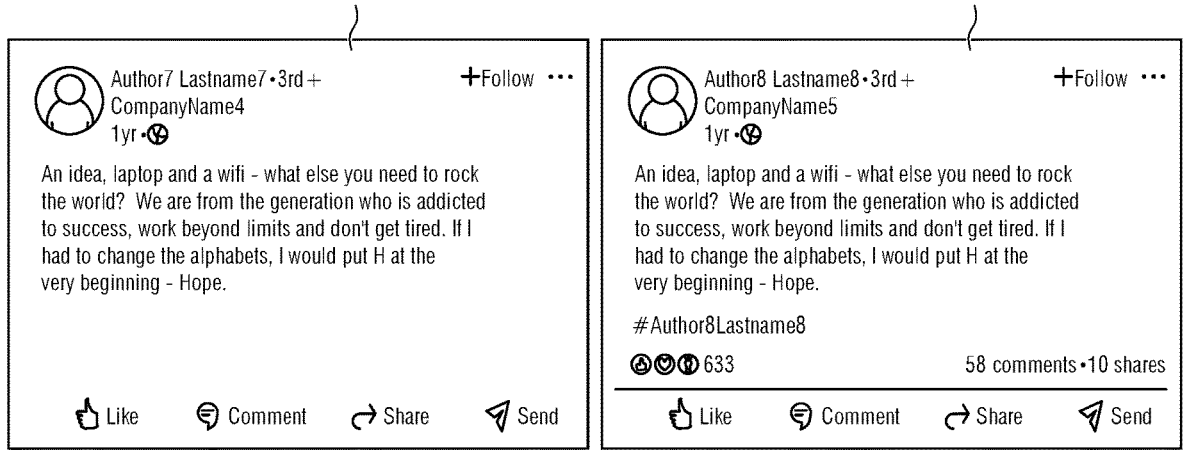
FIG. 4C illustrates example screen captures of copypasta content items 442, 444 in accordance with some embodiments of the present disclosure.

FIG. 4A illustrates an example of non-disruptive copypasta. In the example of FIG. 4A, a copypasta cluster 400 includes four content items 402, 404, 406, 408, which each have been posted to an online system by a different user of the online system. Each of the content items 402, 404, 406, 408 contains the identical text. However, the authors of the content items 402, 404, 406, 408 are all employees of the same organization that is also the subject of the posted text, i.e., a major news announcement about the company. It would be desirable for distribution of the content item in the copypasta cluster 400 to be permitted by each of the authors and not filtered out, because each of the post authors appears to be authentically sharing news about their common employer.

Conventional copypasta filters that operate in a similar way as spam filters are not able to distinguish non-disruptive copypasta such as content items 402, 404, 406, 408 from disruptive copypasta such as content items 424, 442, because the conventional filters generate too many false positives and do not provide a mechanism for allowing the distribution of non-disruptive copypasta, e.g., by allowing non-disruptive copypasta to avoid the filters and continue distribution.

Figure 4D:
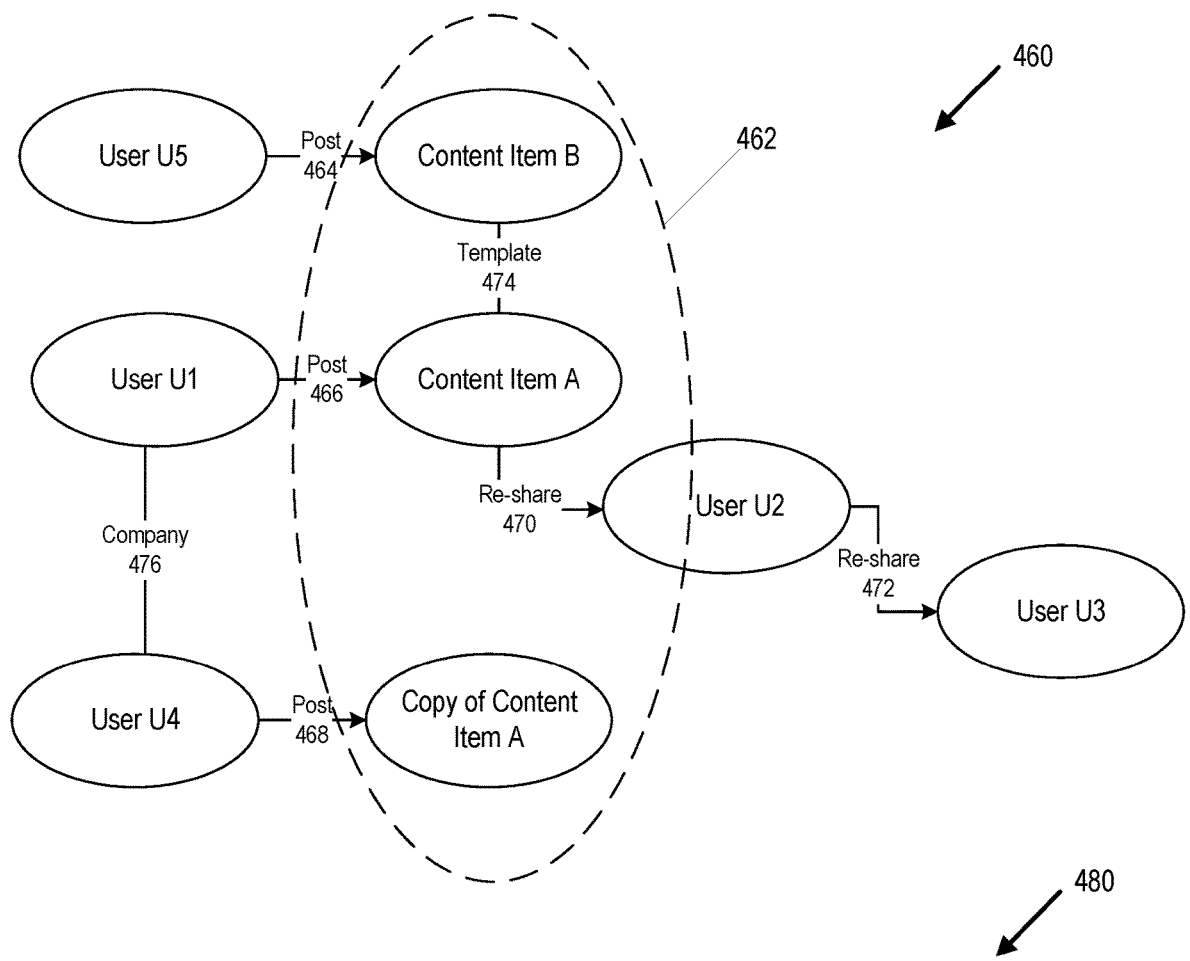
FIG. 4D illustrates an example of a graph representation of a logical data structure 460 of a copypasta cluster in accordance with some embodiments of the present disclosure.
Figure 4E:
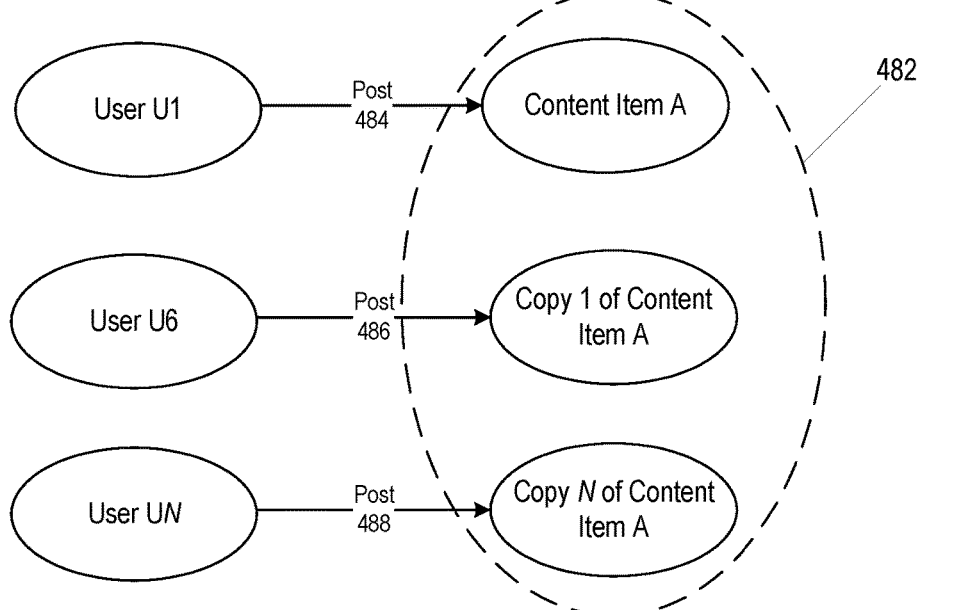
FIG. 4E illustrates an example of a graph representation of a logical data structure 480 for a copypasta cluster in accordance with some embodiments of the present disclosure.

FIG. 4D and FIG. 4E illustrate effects of disruptive copypasta on computing resources when compared to non-disruptive copypasta. In FIG. 4D and FIG. 4E, examples of logical data structures are shown, including relationships between data pertaining to user activity in an online system modeled as graphs with nodes representing entities and edges signifying relationships between nodes.

FIG. 4D illustrates a logical data structure 460 showing different examples of non-disruptive copypasta in a copypasta cluster 462 that should not be filtered. In FIG. 4D, a user U1 created a post 466 containing a content item A. User U2 created a re-share 470 of user U1's original post 466, e.g., by clicking on a re-share button associated with the post 466, and user U3 created a re-share 472 of user U2's re-share 470. Also, a user U5 created a different post 464 containing a content item B using the same template 474 as used by user U1 to create the post 466 containing content item A. Further, a user U4 created a post 468 containing a copy of content item A, but user U4 and user U1 are associated with the same company 476.

As can be seen in FIG. 4D, the re-sharing of the post 466 does not cause the online system to create additional nodes for each re-share of content item A; i.e., the re-share function does not create a duplicate copy of the re-shared content item. Instead, each re-sharing operation creates a link or pointer back to the original post 466. As such, the re-shares 470, 472 are considered non-disruptive because they conserve computing resources such as memory and data storage by creating and maintaining a link back to the original post rather than creating duplicative content nodes.

The post 464 is included in the copypasta cluster 462 because content item B is similar to content item A in that, as an example, both content item A and content item B were created using the same template 474. However, portions of the content item B are different from the content item A. For example, the content item B might include a photo of user U5 in the template 474 while the content item A includes a photo of user U1 in the same template. Thus, despite having some similarities to post 466, post 464 is an original post of user U5 that is non-disruptive and should not be filtered.

The post 468 is included in the copypasta cluster 462 because, as an example, its content is an exact copy of content item A posted by user U1. However, user U1 and user U4 are related by company 476. Thus, post 468 can be considered non-disruptive and should not be filtered.

In contrast to FIG. 4D, FIG. 4E illustrates an example of a graph representation of a logical data structure 480 showing a disruptive copypasta cluster 482 that should be filtered. In FIG. 4E, a user U1 created a post 484 containing content item A. User U6 created a post 486 containing a copy of content item A without re-sharing user U1's original post 484. Similarly, N other users each created other posts 488 each containing a copy of content item A without re-sharing user U1's original post 484, where N is a positive integer. There are no relationships between user U1 and any of the N other users who posted copies of content item A, and there are no relationships between any of the posts 484, 486, 488, such as a common template. Thus, in contrast to the logical data structure 460, the logical data structure 480 contains an additional node for each duplicate copy of content item A, and these additional nodes are not linked back to the original post 484. Additionally, there are no links in the logical data structure 480 between any of user U6, user UN, post 486, and post 488 and any of user U1 or post 484.

Large online systems can contain hundreds of thousands of copypasta clusters like cluster 482. Thus, particularly in larger online systems, the user activity modeled by the logical data structure 480 can strain computing resources like memory, data storage, processing capacity, and network bandwidth, because it creates unnecessary additional nodes for the duplicate copies of content item A and does not contain any links between the post 486 or the post 488 and the original post 484.

This disclosure provides technical solutions to the challenges of filtering copypasta in a way that permits distribution of non-disruptive copypasta while filtering disruptive copypasta so as to prevent disruptive copypasta from unnecessarily straining computing resources, annoying other users and disrupting online discourse.

In contrast to prior approaches, aspects of the disclosed technologies use author intent to distinguish between non-disruptive copypasta and disruptive copypasta. Author intent or intent, as used herein, refers to user intent, specifically, the intent of the user who is the author of a post with respect to the user's action of making the post, i.e., why did this user make this post? Post as used herein refers to a user-generated distribution of a digital content item through an online system such as a social network. Examples of posts include original content items, re-shared content items, and copypasta. A user makes a post through a graphical user interface by, for example, clicking on a "post" icon, which displays an input box and/or mechanism for uploading content. The user uploads a content item or enters content in the input box, and then clicks on a "post" button. Clicking on the post button causes the online system to distribute the content item to other users of the online system. A user can be a human user interacting with an online system through an input device or an automated process such as a bot that generates content items using e.g., a generative language model. A distribution as used herein includes, for example, interacting with a user interface to make a content item available through a news feed, a set of search results, a notification, or a message, in an online system.

The disclosed technologies provide sets of filters that filter disruptive copypasta based on computer-generated estimations of author intent. For example, aspects of the disclosed technologies include a set of exclusionary filters, which exclude non-disruptive copypasta clusters from the filtering mechanism based on characteristics of the copypasta clusters that are indicators of non-disruptive or "good intent copypasta." The filtering mechanism allows distribution of the non-disruptive or "good intent" copypasta clusters, i.e., those copypasta clusters that have one or more indicators of non-disruptive copypasta, to continue through the online system. Aspects of the disclosed technologies also provide a set of inclusionary filters, which apply the copypasta filtering mechanism only to copypasta clusters that are not in the set of excluded non-disruptive copypasta clusters. The set of inclusionary filters distinguishes between characteristics of the copypasta clusters that are indicators of possibly disruptive copypasta clusters and characteristics that are indicators of disruptive (or "bad intent") copypasta clusters. The set of inclusionary filters only filters out the disruptive copypasta clusters, i.e., those copypasta clusters that have one or more of the indicators of disruptive copypasta.

To distinguish between non-disruptive, possibly disruptive, and disruptive copypasta clusters, aspects of the disclosed technologies extract features associated with user-posted content items. Features are extracted from, for example, attribute data and/or activity data, also referred to as metadata in some implementations, associated with the content items in the copypasta clusters. The extracted features are evaluated for signals of non-disruptive author intent and for signals of disruptive author intent. For instance, the extracted features are measured using heuristics, machine learning models, or a combination of heuristics and machine learning models. In this way, the disclosed technologies distinguish between non-disruptive copypasta and disruptive copypasta so that only the disruptive copypasta is filtered and distribution of the non-disruptive copypasta is permitted to continue through the online system.

The sets of filters provided by the disclosed technologies have broad applicability. For example, some of the filters may be very effective at filtering out disruptive copypasta in some applications but other filters may be more effective in other applications. In this way, aspects of the disclosed filtering mechanisms are configurable for a wide variety of online applications.

Aspects of the disclosed technologies are described in the context of online systems including network-based digital content distribution systems. An example of a content distribution use case is the distribution of user-generated content such as text, images, video, audio, or combinations of different forms of content through an online social network or social graph-based application. However, aspects of the disclosed technologies are not limited to social media applications, but can be used to improve copypasta filtering systems for other applications. Further, any network-based application software system can act as a content distribution system. For example, news, entertainment, and e-commerce apps installed on mobile devices, enterprise systems, messaging systems, and social graph-based applications can all function as content distribution systems.

The disclosure will be understood more fully from the detailed description given below and from the accompanying drawings of various embodiments of the disclosure. The drawings, however, should not be taken to limit the disclosure to the specific embodiments, but are for explanation and understanding only.

FIG. 1 illustrates an example computing system 100 that includes a copypasta filtering system in accordance with some embodiments of the present disclosure.

In the embodiment of FIG. 1, computing system 100 includes one or more user systems 110, a network 120, an application software system 130, a copypasta filtering system 140, a content moderation system 150, a content serving system 160, an event logging service 170, and a data storage system 180. As described in more detail below, components of the copypasta filtering system 140 include a cluster generator 142, a feature generator 144, and a copypasta classification system 146.

A user system 110 includes at least one computing device, such as a personal computing device, a server, a mobile computing device, or a smart appliance, and at least one software application that the at least one computing device is capable of executing. Many different user systems 110 can be connected to network 120 at the same time or at different times. Different user systems 110 can contain similar components as described in connection with the illustrated user system 110. For example, many different end users of computing system 100 can be interacting with many different instances of application software system 130 through their respective user systems 110, at the same time or at different times.

User system 110 includes a user interface 112. User interface 112 is installed on or accessible to user system 110 by network 120. For example, embodiments of user interface 112 include a graphical display screen that includes at least one slot. A slot as used herein refers to a space on a graphical display such as a web page or mobile device screen, into which digital content items including copypasta may be loaded for display to the user. The locations and dimensions of a particular slot on a screen are specified using, for example, a markup language such as HTML (Hypertext Markup Language). On a typical display screen, a slot is defined by two-dimensional coordinates. In other implementations such as virtual reality or augmented reality implementations, a slot may be defined using a three-dimensional coordinate system.

User interface 112 can be used to input data, upload, download, receive, send, or share content items including copypasta, initiate user interface events, and view or otherwise perceive output such as data produced by application software system 130, copypasta filtering system 140, content moderation system, and/or content serving system 160. For example, user interface 112 can include a graphical user interface (GUI), a conversational voice/speech interface, a virtual reality, augmented reality, or mixed reality interface, and/or a haptic interface. User interface 112 includes a mechanism for logging in to application software system 130, clicking or tapping on GUI elements, and interacting with digital content items. Examples of user interface 112 include web browsers, command line interfaces, and mobile app front ends. User interface 112 as used herein can include application programming interfaces (APIs).

Network 120 can be implemented on any medium or mechanism that provides for the exchange of data, signals, and/or instructions between the various components of computing system 100. Examples of network 120 include, without limitation, a Local Area Network (LAN), a Wide Area Network (WAN), an Ethernet network or the Internet, or at least one terrestrial, satellite or wireless link, or a combination of any number of different networks and/or communication links.

Application software system 130 is any type of application software system that provides or enables the creation, upload, and/or distribution of at least one form of digital content including copypasta to user systems such as user system 110 through user interface 112. In some implementations, portions of copypasta filtering system 140 are components of application software system 130. Examples of application software system 130 include but are not limited to online services such as professional social network software and/or other social graph-based applications, as well as other online systems that are or are not be based on social graph software, such as general-purpose search engines, specific-purpose search engines, messaging systems, content distribution platforms, e-commerce software, enterprise software, or any combination of any of the foregoing or other types of software.

A client portion of application software system 130 can operate in user system 110, for example as a plugin or widget in a graphical user interface of a web application, mobile software application, or as a web browser executing user interface 112. In an embodiment, a mobile app or a web browser of a user system 110 can transmit a network communication such as an HTTP request over network 120 in response to user input that is received through a user interface provided by the web application, mobile app, or web browser, such as user interface 112. A server running application software system 130 can receive the input from the web application, mobile app, or browser executing user interface 112, perform at least one operation using the input, and return output to the user interface 112 using a network communication such as an HTTP response, which the web application, mobile app, or browser receives and processes at the user system 110.

Copypasta filtering system 140 filters copypasta being distributed through application software system 130 based on data signals of user intent that are associated with the copypasta. Copypasta filtering system 140 runs periodically on a server or back end system, e.g., as an offline job that evaluates and processes copypasta circulating through the application software system 130. Copypasta filtering system 140 includes cluster generator 142, feature generator 144, and copypasta classification system 146.

As described in more detail below, cluster generator 142 generates copypasta clusters, feature generator 144 extracts features from the copypasta clusters generated by cluster generator 142, and copypasta classification system 146 evaluates the features extracted by feature generator 144 using heuristics, machine learning technologies, or a combination of heuristics and machine learning. Based on the feature evaluations performed by copypasta classification system 146, copypasta filtering system 140 assigns labels to the copypasta clusters. The labels are used to determine whether particular copypasta clusters are non-disruptive or disruptive.

Copypasta filtering system 140 and/or portions of application software system 130 process the labeled copypasta clusters according to the labels assigned to each copypasta cluster. For example, copypasta clusters that have been assigned a label that corresponds to a non-disruptive or "good" intent can be forwarded to content serving system 160 for scoring and distribution according to the assigned label, while copypasta clusters that have been assigned a label that corresponds to a disruptive or "bad" intent may be forwarded to content moderation system 150 for human review or may be forwarded to content serving system 160 for scoring according to the assigned label.

In some implementations, as described in more detail below, labeled copypasta clusters produced using heuristics-based filter sets are used as training data to train a machine learning model, such as a binary classifier, to distinguish between characteristics of copypasta that are indicators of non-disruptive or "good intent" copypasta clusters and characteristics of copypasta that are indicators of disruptive or "bad intent" copypasta clusters using machine learning.

Content moderation system 150 is a system that provides an online portal for human review of submissions of digital content items. Content moderation submissions include user-generated reports that identify content items for human review. For example, a user viewing a news feed can submit a report for a content item appearing in the user's news feed if the user believes that the content item violates a community standard of the online system.

The submissions are created using, e.g., e.g., an online form, and are routed to content moderation system 150 through, e.g., the network 120. Content moderation submissions can also or alternatively include reports that are generated by automated systems such as machine learning classifiers, spam filters, and copypasta filtering system 140. Content moderation system 150 can be implemented as a component of application software system 130 or content serving system 160. Output of content moderation system 150 can be used to control the distribution of submitted content items through the online system. For example, the distribution of a user-reported content item may be reduced or modified after a human reviewer using content moderation system 150 reviews and verifies a user-generated report.

Content serving system 160 is a data storage service, such as a web server, which stores digital content items including copypasta, and distributes digital content items, including copypasta, to, for example, web sites and mobile apps or to particular slots of web sites or mobile app user interface display screens, using network 120. For instance, content serving system 160 scores and ranks digital content items including copypasta for placement in user feeds.

In some embodiments, content serving system 160 processes requests from, for example, application software system 130 or copypasta filtering system 140, and distributes digital content items, including copypasta, to user systems 110 or other destinations, such as content moderation system 150, in response to requests. A request is, for example, a network message such as an HTTP (HyperText Transfer Protocol) request for a transfer of data from an application front end to the application's back end, or from the application's back end to the front end. A request is formulated, e.g., by a browser or mobile app at a user device, in connection with a user interface event such as a login, click or a page load. In some implementations, content serving system 160 is part of application software system 130.

Content serving system 160 includes at least one content classification model 162 and at least one content scoring model 164. Content classification model 162 is a machine learning model that has been trained to classify an input by assigning one or more semantic labels to the input based on a statistical or probabilistic similarly of the input to labeled data used to train the model. Content classification model 162 is created by applying a machine learning algorithm, such as linear regression or logistic regression, to a set of training data using, for example, a supervised machine learning technique. In supervised machine learning, the set of training data includes labeled data samples. In some implementations, content classification model 162 is created by applying a clustering algorithm, such as k means clustering, to a set of training data that includes unlabeled data samples, using an unsupervised machine learning technique. An example of a content classification model is a binary classifier that identifies inputs as either spam or not spam. Another example of a content classification model is a topic model that assigns an input to one topic or multiple topics based on similarities between the input and the unlabeled data used to train the model. In some implementations, content classification model 162 is used to digital content items by category. For example, in copypasta filtering system 140, a content classification model 162 can be used to group similar or identical content items together to form a copypasta cluster.

Content scoring model 164 is a machine learning model that is trained to generate a score for a pair of inputs, where the score statistically or probabilistically quantifies a strength of relationship, correlation, or affinity between the inputs in the pair. The scores produced by content scoring model 164 can be computed based on the labels produced by copypasta filtering system 140. For example, content items in a copypasta cluster that has been assigned a disruptive or "bad intent" label by copypasta filtering system 140 can be downranked by content scoring model 164 so that those items have a lower score and appear less frequently in user feeds. Similarly, content items in a copypasta clusters that has been assigned a non-disruptive or "good intent" label by copypasta filtering system 140 can be upranked by content scoring model 164 so that those items have a higher score and appear more frequently in user feeds. Alternatively or in addition, content scoring model 164 can take no action, e.g., leave a previously computed ranking score unchanged, based on the label produced by copypasta filtering system 140.

Content scoring model 164 includes, for example, a deep learning neural network model that is trained on training data that includes ground-truth sets of data pairs. Examples of content scoring models include ranking models that rank content items for distribution to a particular user or user group, such as for inclusion in a user or affinity group's news feed or online learning portal, where the ranking is based on training examples of the user's or affinity group's history of clicking or not clicking on content items previously displayed in user interface 112 (e.g., [user1, contentID1, 1]; [user1, contentID2, 0], where 1 indicates a click and 0 indicates no click). A weighting factor whose value is based on output of copypasta filtering system 140 and/or output of content moderation system 150 can be applied to ranking scores to modify the output of content scoring model 164. For example, if the copypasta filtering system 140 outputs a label of "disruptive," the weighting factor can be assigned a value less than 1 so that the content item is downranked. Similarly, if the copypasta filtering system 140 outputs a label of "non-disruptive," the weighting factor can be assigned a value equal to or greater than one so that the content item is upranked.

Event logging service 170 captures user interface events generated at the user interface 112, such as content item uploads, posts, page loads and clicks, in real time, and formulates the user interface events into a data stream that can be consumed by, for example, a stream processing system. For example, when a user of user system 110 clicks on a user interface element such as a content item including copypasta, a link, or a control such as a view, comment, share, or reaction button, or uploads a file, or creates a post, loads a web page, or scrolls through a feed, etc., event logging service 170 fires an event to capture an identifier, an event type, a date/timestamp at which the user interface event occurred, and possibly other information about the user interface event, such as the impression portal and/or the impression channel involved in the user interface event (e.g., device type, operating system, etc.).

For instance, when a user creates a post or re-shares another post, event logging service 170 stores the corresponding event data in a log. Event logging service 170 generates a data stream that includes one record of real-time event data for each user interface event that has occurred. Event data logged by event logging service 170 can be used, for example, to train content scoring model 164 and/or content classification model 162. In some implementations, event data logged by event logging service 170 is used to train a machine learning model, such as a machine learning model of copypasta classification system 146 or intent classification system 306, described below, to label copypasta clusters.

Data storage system 180 includes data stores and/or data services that store digital content items including copypasta, data received, used, manipulated, and produced by application software system 130 and/or copypasta filtering system 140, including copypasta labels, features, attributes, event data, machine learning model training data, machine learning model parameters, and machine learning model inputs and outputs. In some embodiments, data storage system 180 includes multiple different types of data storage and/or a distributed data service. As used herein, data service may refer to a physical, geographic grouping of machines, a logical grouping of machines, or a single machine. For example, a data service may be a data center, a cluster, a group of clusters, or a machine.

Data stores of data storage system 180 can be configured to store data produced by real-time and/or offline (e.g., batch) data processing. A data store configured for real-time data processing can be referred to as a real-time data store. A data store configured for offline or batch data processing can be referred to as an offline data store. Data stores can be implemented using databases, such as key-value stores, relational databases, and/or graph databases. Data can be written to and read from data stores using query technologies, e.g., SQL or NoSQL.

A key-value database, or key-value store, is a nonrelational database that organizes and stores data records as key-value pairs. The key uniquely identifies the data record, i.e., the value associated with the key. The value associated with a given key can be, e.g., a single data value, a list of data values, or another key-value pair. For example, the value associated with a key can be either the data being identified by the key or a pointer to that data. A relational database defines a data structure as a table or group of tables in which data are stored in rows and columns, where each column of the table corresponds to a data field. Relational databases use keys to create relationships between data stored in different tables, and the keys can be used to join data stored in different tables. Graph databases organize data using a graph data structure that includes a number of interconnected graph primitives. Examples of graph primitives include nodes, edges, and predicates, where a node stores data, an edge creates a relationship between two nodes, and a predicate is assigned to an edge. The predicate defines or describes the type of relationship that exists between the nodes connected by the edge.

Data storage system 180 resides on at least one persistent and/or volatile storage device that can reside within the same local network as at least one other device of computing system 100 and/or in a network that is remote relative to at least one other device of computing system 100. Thus, although depicted as being included in computing system 100, portions of data storage system 180 can be part of computing system 100 or accessed by computing system 100 over a network, such as network 120.

While not specifically shown, it should be understood that any of user system 110, application software system 130, copypasta filtering system 140, content moderation system 150, content serving system 160, event logging service 170, and data storage system 180 includes an interface embodied as computer programming code stored in computer memory that when executed causes a computing device to enable bidirectional communication with any other of user system 110, application software system 130, copypasta filtering system 140, content moderation system 150, content serving system 160, event logging service 170, and data storage system 180 using a communicative coupling mechanism. Examples of communicative coupling mechanisms include network interfaces, inter-process communication (IPC) interfaces and application program interfaces (APIs).

Each of user system 110, application software system 130, copypasta filtering system 140, content moderation system 150, content serving system 160, event logging service 170, and data storage system 180 is implemented using at least one computing device that is communicatively coupled to electronic communications network 120. Any of user system 110, application software system 130, copypasta filtering system 140, content moderation system 150, content serving system 160, event logging service 170, and data storage system 180 can be bidirectionally communicatively coupled by network 120. User system 110 as well as other different user systems (not shown) can be bidirectionally communicatively coupled to application software system 130.

A typical user of user system 110 can be an administrator or end user of application software system 130, copypasta filtering system 140, content moderation system 150, and/or content serving system 160. User system 110 is configured to communicate bidirectionally with any of application software system 130, copypasta filtering system 140, content moderation system 150, and/or content serving system 160 over network 120.

Terms such as component, system, and model as used herein refer to computer implemented structures, e.g., combinations of software and hardware such as computer programming logic, data, and/or data structures implemented in electrical circuitry, stored in memory, and/or executed by one or more hardware processors.

The features and functionality of user system 110, application software system 130, copypasta filtering system 140, content moderation system 150, content serving system 160, event logging service 170, and data storage system 180 are implemented using computer software, hardware, or software and hardware, and can include combinations of automated functionality, data structures, and digital data, which are represented schematically in the figures. User system 110, application software system 130, copypasta filtering system 140, content moderation system 150, content serving system 160, event logging service 170, and data storage system 180 are shown as separate elements in FIG. 1 for ease of discussion but, except as otherwise described, the illustration is not meant to imply that separation of these elements is required. The illustrated systems, services, and data stores (or their functionality) of each of user system 110, application software system 130, copypasta filtering system 140, content moderation system 150, content serving system 160, event logging service 170, and data storage system 180 can be divided over any number of physical systems, including a single physical computer system, and can communicate with each other in any appropriate manner.

For ease of discussion, in FIG. 6, the copypasta filtering system 140 is represented as copypasta filtering system 650. Further details with regard to the operations of the copypasta filtering system 140 are described below.

Figure 2:
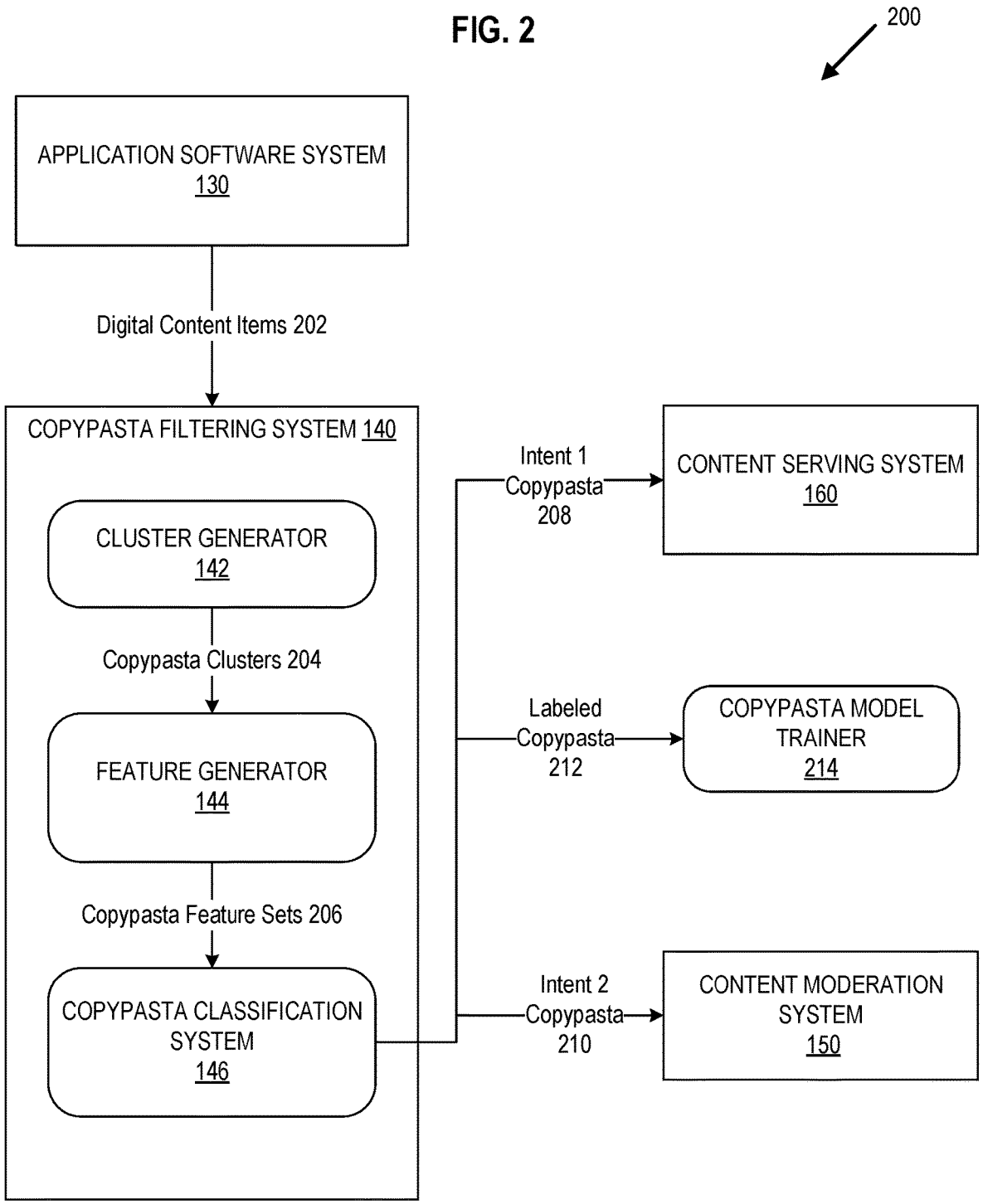
FIG. 2 is a flow diagram of an example method 200 for detecting and filtering copypasta in accordance with some embodiments of the present disclosure.

FIG. 2 is a flow diagram of an example method 200 for detecting and filtering copypasta in accordance with some embodiments of the present disclosure.

The method 200 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 200 is performed by various components of the computing system 100 of FIG. 1 including portions of copypasta filtering system 140. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, processes can be omitted in various embodiments. Thus, not all processes are required in every embodiment. Other process flows are possible.

In FIG. 2, copypasta filtering system 140 receives digital content items 202 from application software system 130. Digital content items 202 are user-generated content items, such as posts and re-shares, where a user can be a human user or an automated process such as a generative language model. Digital content items 202 are in a process of being distributed to users of application software system 130, and can include original posts and copypasta. In some online systems, the volume of digital content items 202 is in the range of hundreds of thousands to millions of content items per day. As an example, digital content items 202 can be represented and stored by content item data records such as the data records shown in Table 1 below.

TABLE 1

Examples of content item data records.

| Content Item ID | User ID | Create Date/Time | Content |
|---|---|---|---|
| CI0001 | U0001 | Sep. 9, 2022 12:15 | It's SNOWING on Wall Street! Company 1 wouldn't be here today without our amazing #customers and #partners. When our #customers and #partners win, we win. #Company1IPO |
| CI0002 | U0002 | Sep. 9, 2022 12:35 | It's SNOWING on Wall Street! Company 1 wouldn't be here today without our amazing #customers and #partners. When our #customers and #partners win, we win. #Company1IPO |
| CI0003 | U0004 | Oct. 10, 2022 13:05 | CompanyX is the most democratized social media platform ever (from a content perspective) You could have literally 0 followers and your video will have as good of a chance of going viral as someone with millions of followers. Good content wins. That's why CompanyX will win as a platform. CompanyX prioritizes good content, not people with big followings. |
| CI0004 | U0005 | Oct. 12, 2022 15:22 | CompanyX is the most democratized social media platform ever (from a content perspective) You could have literally 0 followers and your video will have as good of a chance of going viral as someone with millions of followers. Good content wins. That's why CompanyX will win as a platform. CompanyX prioritizes good content, not people with big followings. |

In the example of Table 1, the data records for content items CI0001 and CI0002 correspond to the content items 402, 404 of FIG. 4A while the data records for content items CI0003 and CI0004 correspond to the content items 422, 424 of FIG. 4B. In Table 1, each data record contains four fields: content identifier, user identifier, creation date/time, and content. In the example, the content field includes text and links (e.g., uniform resource locators or URLs, hashtags) but in other examples the content field includes other types of content such as audio or video alone or in combination with text and/or links. Table 1 illustrates data records using a tabular form for ease of discussion, but other forms of data structures can be used, such as graphs and key-value stores. Table 1 and the examples of data records shown in Table 1 are provided for illustration. This disclosure is not limited to these examples.

Cluster generator 142 applies at least one clustering algorithm to digital content items 202 to create copypasta clusters 204. For example, cluster generator 142 can create the cluster 400 including the similar content items 402, 404, 406, 408, the cluster 420 including the similar content items 422, 424, and the cluster 440 including the similar content items 442, 444.

Cluster generator 142 groups digital content items 202 into copypasta clusters 204 based on content similarity. For example, posts that have the same or similar text or digital imagery are grouped together in the same cluster. Cluster generator 142 is implemented using an unsupervised or semi-supervised clustering algorithm such as a text similarity detector. An example of a text similarity detector is a near-duplicate detection classifier.

A near-duplicate detection classifier is a semi-supervised process that groups documents into clusters with the original reference document identified. Using a near-duplicate detection classifier or similar approach, the original content item and copies or near-copies of the original content item are grouped together in the same cluster. Cluster generator 142 determines which content item of a group of similar content items is the original content item based on the content item's creation date and timestamp as obtained from the online system, e.g., application software system 130. For example, cluster generator 142 identifies the content item with the earliest creation date in the cluster as the original content item. Cluster generator 142 outputs copypasta clusters 204 to feature generator 144. Examples of copypasta clusters 204 that can be produced by cluster generator 142 include the clusters 400, 420, 440 described above.

As an example, copypasta clusters 204 can be represented and stored as cluster data records such as the data records shown in Table 2 below.

TABLE 2

Examples of copypasta cluster data records.

| Cluster ID | Content Item ID | Creation Date/Time | Original Flag |
|---|---|---|---|
| CL0001 | CI0001 | Sep. 9, 2022 12:15 | 1 |
| CL0001 | CI0002 | Sep. 9, 2022 12:35 | 0 |
| CL0002 | CI0003 | Oct. 10, 2022 13:05 | 1 |
| CL0002 | CI0004 | Oct. 12, 2022 15:22 | 0 |

In the example of Table 2, a first copypasta cluster CL0001 includes content items CI0001 and CI0002 of Table 1 and a second copypasta cluster CL0002 includes content items CI0003 and CI0004 of Table 1. Copypasta cluster CL0001 corresponds to copypasta cluster 400 (with content items 406, 408 omitted) while copypasta cluster CL0002 corresponds to copypasta cluster 420. In Table 2, each data record contains the following fields: cluster identifier, content item identifier, creation date/time, and an original flag. In the example, the original flag field contains a binary value of zero or one. In the example, the original flag is set to one for content item CI0001 and content item CI0003 because those content items have the earliest create date/timestamp of the content items in their respective clusters. Table 2 illustrates data records using a tabular form for ease of discussion, but other forms of data structures can be used, such as graphs and key-value stores. Table 2 and the examples of data records shown in Table 2 are provided for illustration. This disclosure is not limited to these examples.

Feature generator 144 extracts feature sets from the copypasta clusters. The feature sets extracted by feature generator 144 include a first feature set, which includes features that are signals of non-disruptive copypasta, and a second feature set, which includes features that are signals of disruptive copypasta. The features that make up the first and second feature sets are aggregations of attribute data associated with individual content items in a cluster and/or the authors of those content items. To generate an aggregate feature for a cluster, feature generator 144 extracts attribute data from individual content items in the cluster and/or related data records associated with the authors of those content items, and aggregates the extracted attribute data to create the aggregate feature.

To generate an aggregate feature, feature generator 144 extracts the applicable attribute data from the individual content items in a copypasta cluster 204 and applies an aggregation function to the attribute data extracted from all of the individual content items in the cluster. Examples of aggregation functions include sum, count, mean, average, percentage. A feature set includes at least one aggregate feature.

Figure 3:
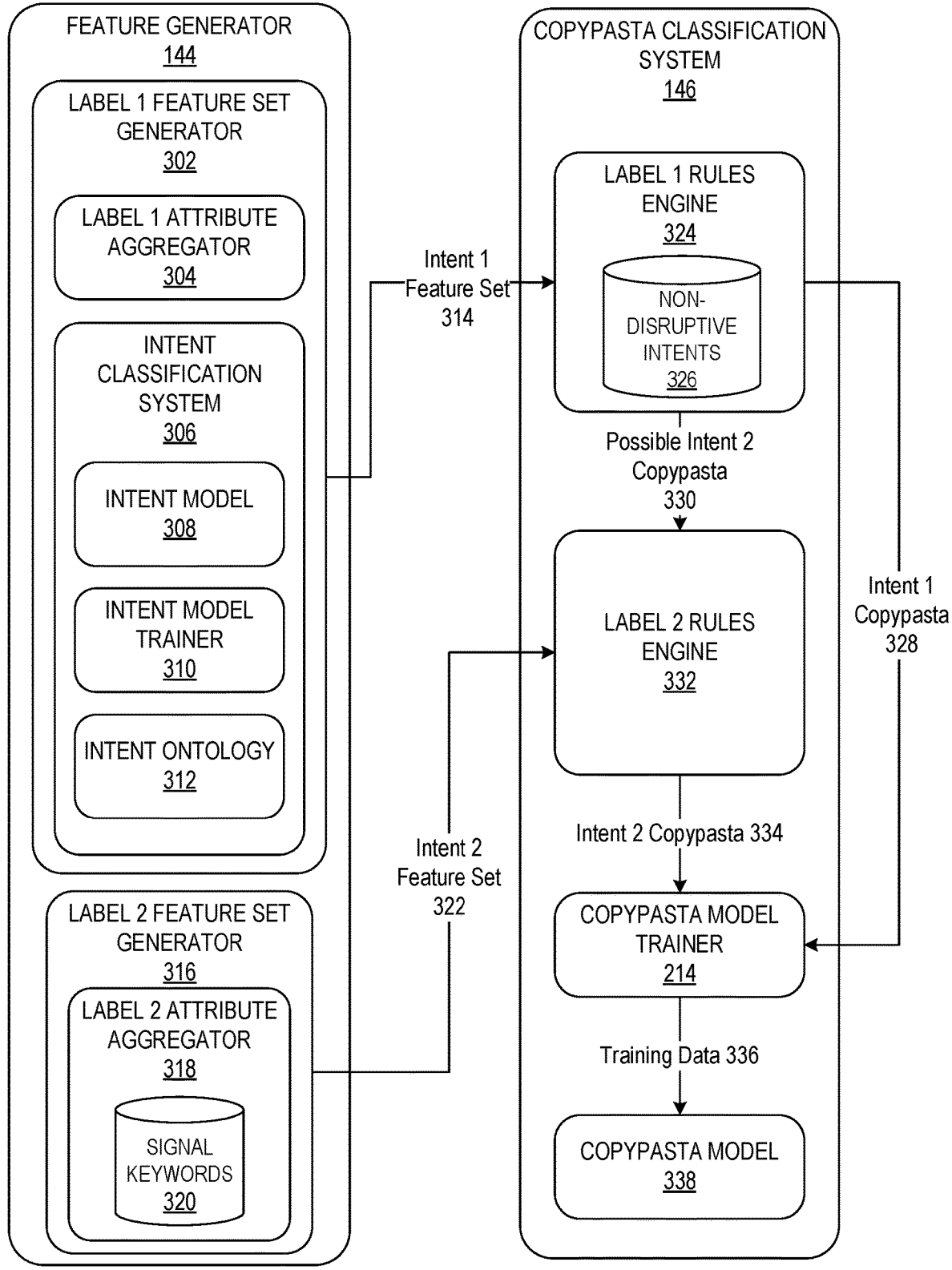
FIG. 3 is a flow diagram of an example method 300 for detecting and filtering copypasta in accordance with some embodiments of the present disclosure.

Examples of attribute data of or related to individual content items, which can be used to generate the features included in the first feature set, i.e., which are signals of non-disruptive copypasta, include the content item authors, e.g., the user identifiers (IDs) associated with the creation of the content item; the organization associated with the user ID, e.g., an organization identifier most recently associated with each author of the content item as the author's employer; whether the content item is a re-share of another content item; and attribute data to be used as input to intent classification system 306, described below with reference to FIG. 3, to generate an intent label associated with the author's post of the content item. The attribute data to be used as input to the intent classification system 306 includes semantic information about the posted content item, such as keywords or phrases extracted from the text of the content item or the entire text of the content item.

Examples of attribute data of individual content items that can be used to generate the features included in the second feature set, i.e., which are signals of disruptive copypasta, include activity data that includes user-submitted reports associated with the content item, e.g., submissions made by users to content moderation system 150, activity data that indicates whether the content item has been viewed by other users through the online system, and activity data that indicates whether any comments on the content item contain any signal keywords that are indicators of disruptive intent, such as "copy" or "this is copypasta" or "fake." As described in more detail below with reference to FIG. 3, signal keywords can be maintained in a signal keywords database 320.

Some attribute data, such as author and create date, can be extracted from content item data records. Other attribute data includes activity data that can be stored with and extracted from content item data or other data records. As an example, attribute data relating to activities associated with content items and authors of those content items can be represented and stored by activity data records such as the data records shown in Table 3 below.

TABLE 3

Examples of activity data records.

| Activity ID | User ID | Activity Type | Entity ID | Activity Data |
|---|---|---|---|---|
| A0001 | U0001 | Add Organization | O0001 | Company1 |
| A0002 | U0010 | Re-Share | CI0008 | U0009 |
| A0003 | U0022 | View | CI0001 | 0.5 s |
| A0004 | U0033 | Report | CI0002 | Spam |
| A0005 | U0044 | Comment | CI0004 | "This is copypasta!" |
| A0006 | U0055 | Add Job Title | J0003 | Software Engineer |
| A0008 | U0066 | Job Search | JS0001 | Data Scientist |

In the example of Table 3, the data records contain data for different types of activity that can be associated with users and/or content items within an online system. Activity data can be obtained from, for instance, event logging service 170, described above. Each example activity data record includes an activity identifier, a user ID, an activity type, an entity identifier that identifies a particular activity and activity type, and activity data that describes the activity associated with the activity ID. For instance, activity A0001 includes an organization identifier 00001 and company name that user U0001 added to their online profile, activity A0002 includes a content item identifier CI0008 of a content item re-shared by user U0010 and a pointer back to the user ID of the author of the re-shared content item, U0009. Activity A0003 indicates that a user U0022 viewed a content item CI0001 for 0.5 seconds. Activity A0004 indicates that a user U0033 reported a content item CI0002 as spam. Activity A0006 includes a job identifier J0003 associated with a job title, Software Engineer, that a user U0055 added to their online profile, and activity A0008 indicates that a user U0066 conducted a job search JS0001 with the search term, data scientist. Table 3 illustrates data records using a tabular form for ease of discussion, but other forms of data structures can be used, such as graphs and key-value stores. Table 3 and the examples of data records shown in Table 3 are provided for illustration. This disclosure is not limited to these examples.

Continuing the above example, feature generator 144 can access data records such as the data records shown in Table 1, Table 2, and Table 3, to create aggregate features. For example, to create an aggregate feature, feature generator 144 identifies a cluster ID, uses the cluster ID as a key to determine all of the content item IDs that are linked with the cluster ID, and uses the content item IDs as keys to extract the relevant content-related attribute data from those content item data records. As another example, feature generator 144 uses the content item IDs associated with a cluster ID as keys to extract activity data containing the content item IDs from activity data records. As an additional example, feature generator 144 determines the user IDs associated with the content items of a cluster and uses the user IDs as keys to extract activity-related attribute data from activity data records.

As an example, aggregate feature data associated with copypasta clusters can be represented and stored by feature data records such as the data records shown in Table 4 below.

TABLE 4

Examples of feature data records.

| Cluster ID | Feature Set ID | Feature ID | Feature Name | Feature Value |
|---|---|---|---|---|
| CL0001 | FS0001 | F0001 | Author count | 4 |
| CL0001 | FS0001 | F0002 | Organization count | 1 |
| CL0001 | FS0001 | F0003 | Re-Share Count | 0 |
| CL0001 | FS0001 | F0004 | Intent | Share Achievement |
| CL0001 | FS0002 | F0006 | User Report Count | 0 |
| CL0001 | FS0002 | F0007 | Original View Count | 2766 |
| CL0001 | FS0002 | F0008 | Signal Keyword Count | 0 |
| CL0002 | FS0001 | F0001 | Author count | 2 |
| CL0002 | FS0001 | F0002 | Organization count | 2 |
| CL0002 | FS0001 | F0003 | Re-Share Count | 0 |
| CL0002 | FS0001 | F0004 | Intent | Not Found |
| CL0002 | FS0002 | F0006 | User Report Count | 0 |
| CL0002 | FS0002 | F0007 | Original View Count | 2761 |
| CL0002 | FS0002 | F0008 | Signal Keyword Count | 1 |

In the example of Table 4, the data records contain data fields for the cluster ID, a feature set ID, the feature ID, a feature name, and a feature value. The feature set ID is used to divide the features into two feature sets in which a first feature set, FS0001, includes features that are signals of non-disruptive copypasta and a second feature set, FS0002, includes features that are signals of disruptive copypasta. The feature name describes the feature identified by the feature ID, and the feature value includes the aggregation of the attribute data for the feature over all content items in the cluster.

Using the example in which cluster CL0001 corresponds to copypasta cluster 400 of FIG. 4A, then for the first feature set, the author count of four is the total number of post authors in the cluster 400 because each of the post content items 402, 404, 406, 408 has a different author. The organization count for the cluster CL0001 is one because all of the post authors belong to the same organization, Company1. The re-share count is zero because none of the posts in the cluster are re-shares. The intent label assigned to the cluster by intent classification system 306 based on the semantic content of the post content items 402, 404, 406, 408, described below, is "share achievement."

As described in more detail below with reference to FIG. 3, intent classification system 306 outputs either a recognized intent label or a "not found" label for each copypasta cluster. The intent label produced by intent classification system 306 for each cluster is used as one feature of the first feature set. Thus, the intent label produced for a cluster by intent classification system 306 based on the semantics of the posts in the cluster are just one of the inputs to copypasta classification system 146, and copypasta classification system 146 evaluates each copypasta cluster based on the intent labels produced by intent classification system 306 in combination with the other features in the first and second feature sets. Intent classification system 305 applies a single intent label to the entire cluster because the semantic content of each of the posts in the cluster is the same or nearly identical as determined by cluster generator 142, described above.

In the second feature set for cluster CL0001, the user report count and signal keyword count are both zero, assuming there are no activity data records indicating user reports or signal keywords in the comments, and the original view count, i.e., the number of views on the original post, corresponds to the view count on the content item 402, which is 2,766.

Similarly, if the cluster CL0002 corresponds to copypasta cluster 420 of FIG. 4B, then for the first feature set, the author count is two, the organization count is two, the re-share count is zero, and "not found" is the intent label assigned to the cluster by intent classification system 306 based on the semantic content of the post content items 422, 424 in the cluster. The intent classification system 306 returns an intent label of "not found" because, as described in more detail below, the intent classification system 306 is configured only to recognize content that corresponds to non-disruptive or "good intent" labels and is not configured to recognize content that corresponds to disruptive or "bad intent" labels. In the second feature set for cluster CL0002, the user report count is zero assuming there are no activity data records indicating user reports of content items in the cluster, the original view count corresponds to the view count of content item 422, which is 2761, and the signal keywords count is one, assuming that the one comment on the content item 424 contains the signal keywords, "this is copypasta!" Table 4 illustrates data records using a tabular form for ease of discussion, but other forms of data structures can be used, such as graphs and key-value stores. Table 4 and the examples of data records shown in Table 4 are provided for illustration. This disclosure is not limited to these examples.

Feature generator 144 outputs copypasta feature sets 206. Copypasta feature sets 206 include, for a given copypasta cluster, both the first feature set of features that are signals of non-disruptive copypasta and the second set of features that are signals of disruptive copypasta.

Copypasta classification system 146 receives the copypasta feature sets 206 produced by feature generator 144 and applies a filtering mechanism including, for example, first and second filter sets, to the respective feature sets 206 for each copypasta cluster. The first filter set is applied to the first feature set and the second filter set is applied to the second feature set.

In some implementations, the first set of filters includes at least one of: a first filter that determines whether copypasta clusters have an author count equal to an author count threshold, a second filter that determines whether copypasta clusters have an organization count equal to an organization count threshold, a third filter that determines whether copypasta clusters have a re-share count equal to a re-share count threshold, and a fourth filter that determines whether copypasta clusters have intent labels that match one or more labels in a set of non-disruptive intent labels, e.g., non-disruptive intents 326 of FIG. 3, described below.

The thresholds used by each of the filters in the first filter set are configurable according to the requirements of a particular application. In some applications, for example, the author count threshold is set to a positive integer such as one, the organization count threshold is set to a positive integer such as one, the re-share count threshold is set to a percentage value such as fifty percent (e.g., are more than 50% of the content items in the cluster re-shares?), and the set of non-disruptive intent labels are curated based on the most common uses of the application. For instance, in some implementations, non-disruptive intents include searching for contacts, organizations, or jobs, promoting a business, congratulating a colleague, and sharing an announcement, advice, or work-related content.

In some implementations, the second set of filters includes at least one of: a first filter that determines whether copypasta clusters have a count of user-submitted reports greater than a user-submitted report threshold; a second filter that determines whether copypasta clusters have a signal keyword count greater than a signal keyword count threshold, and a third filter that determines whether copypasta clusters have an original view count greater than an original view count threshold. The thresholds used by each of the filters in the second filter set are configurable according to the requirements of a particular application. In some applications, for example, the user-submitted report threshold is an integer greater than zero, the signal keyword count threshold is an integer greater than zero, and the original view count threshold is a positive integer that corresponds to a number of views needed for a post to be considered viral by the application; for instance, the original view count threshold could be set to one hundred, one thousand, ten thousand, one hundred thousand, or one million views, depending on the application.

Based on the outputs produced by the filter sets, copypasta classification system 146 generates and outputs labeled copypasta 212. Labeled copypasta includes intent 1 copypasta 208 and intent 2 copypasta 210. Intent 1 copypasta 208 includes copypasta clusters that, based on the output of the first filter set, are labeled as non-disruptive or "good intent" copypasta. Intent 2 copypasta 210 includes copypasta clusters that, based on the output of the second filter set, are labeled as disruptive or "bad intent" copypasta. Whereas the intent labels output by intent classification system 306 are non-binary in that they correspond to the specific semantics of the posts in a particular cluster, e.g., job seeking, congratulating, etc., the intent labels output by copypasta classification system 146 are binary in that they label the copypasta clusters in only one of two ways, e.g., either non-disruptive or disruptive.

In the example of FIG. 2, intent 1 copypasta 208 includes non-disruptive copypasta and as such, intent 1 copypasta 208 is routed to content serving system 160 while intent 2 copypasta includes disruptive copypasta and is routed to content moderation system 150. Labeled copypasta 212, which includes both intent 1 copypasta 208 and intent 2 copypasta 210, is routed to a copypasta model trainer 214. Other downstream actions are applied to portions of the labeled copypasta 212, in other implementations. For example, intent 1 copypasta 208 is routed to content moderation system 150 in some implementations, and intent 2 copypasta 208 is routed to content serving system 160 in some implementations.

As described in more detail below with reference to FIG. 3, copypasta model trainer 214 creates training data for a machine learning-based binary classifier based on the labeled copypasta 212. For instance, copypasta model trainer 214 applies a linear regression or logistic regression algorithm to the copypasta 212 to create a trained machine learning-based binary classifier that can then be used to classify new copypasta inputs alternatively or in addition to a heuristics-based process.

FIG. 3 is a flow diagram of an example method 300 for detecting and filtering copypasta in accordance with some embodiments of the present disclosure.

The method 300 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 300 is performed by various components of the computing system 100 of FIG. 1 including portions of copypasta filtering system 140. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, processes can be omitted in various embodiments. Thus, not all processes are required in every embodiment. Other process flows are possible.

FIG. 3 shows additional details of copypasta feature generator 144 and copypasta classification system 146. In FIG. 3, copypasta feature generator 144 includes a label 1 feature set generator 302 and a label 2 feature set generator 316. In the method 300, label 1 feature set generator 302 generates and outputs a label 1 feature set 314, and label 2 feature set generator 316 generates and outputs an intent 2 feature set 322. In the illustrated implementations, label 1 corresponds to a non-disruptive or "good intent" label while label 2 corresponds to a disruptive or "bad intent" label. In other implementations, label 1 and label 2 can be defined differently.

Label 1 feature set generator 302 includes a label 1 attribute aggregator 304 and intent classification system 306. Label 1 attribute aggregator 304 performs the applicable aggregations on the features extracted from the content items of each copypasta cluster to create the first feature set as described above with reference to FIG. 2. For example, label 1 attribute aggregator 304 generates a count of occurrences of each unique author in a copypasta cluster, e.g., if there are four content items in the cluster and each has a different author, then the author count is four, but if there are four content items in the cluster and two of the content items have the same author, then the author count is three. Similarly, label 1 attribute generator 304 generates a count of occurrences of each unique organization name in a copypasta cluster, e.g., if there are four content items in the cluster and each has an author associated with a different company name, then the organization count is four, but if there are four content items in the cluster and two of the content items have authors that are associated with the same company name, then the organization count is three. As another example, for each cluster, label 1 attribute generator 304 counts the number of times the original content item has been re-shared. For instance, if there is only one content item in a cluster and it has been re-shared fifty times, then the re-share count is fifty, but if there are five content items in a cluster and the original content item has been re-shared fifty times then regardless of how many times the other four content items have been re-shared, the re-share count is fifty.

Intent classification system 306 assigns an intent label to each copypasta cluster based on the semantic content of the content items in the cluster. Since the content items in each cluster are identical or nearly identical as determined by cluster generator 142, intent classification system 306 only has to evaluate the semantic content of the cluster one time.

Intent classification system 306 includes intent model 308, an intent model trainer 310, and an intent ontology 312. Intent model 308 is a machine learning-based classifier or a set of machine learning-based classifiers. For instance, intent model 308 can be implemented as a multi-class classifier that is trained to recognize multiple different intents or as a set of binary classifiers, where each binary classifier is trained to recognize a different intent.

Intent model trainer 310 generates labeled training data for intent model 308 and applies a machine learning algorithm such as a linear regression algorithm or a logistic regression algorithm to the labeled training data using supervised machine learning. Intent model trainer 310 tests the model using a validation data set and error criteria. When the error criteria are satisfied, e.g., when the difference between the model output and the expected output is within a margin of error, intent model trainer 310 releases intent model 308 for operational use.

Intent model trainer 310 uses intent ontology 312 to label the training data. For example, intent model trainer 310 obtains a data set of content items and assigns ground-truth intent labels to the content items using the intent ontology 312. Intent ontology 312 is, for example, a manually-curated or auto-generated set of relationships between content items and intent labels. For example, intent ontology 312 can be curated to include only non-disruptive intents, only disruptive intents, or a combination of non-disruptive intents and disruptive intents. Intent ontology 312 can be implemented using a table, a hierarchical or tree-based data structure or a graph data structure, for example. Examples of entries that can be included in intent ontology 312 are shown in Table 5.

TABLE 5

| Example ontology. | |
|---|---|
| Intent Label | Example Post |
| Share Knowledge or Advice | You rarely see fresh black currents at market because they have a rather delicate skin. They are most aromatic and flavorful when fresh and can be used in a variety of desserts, jams, compotes, and even Creme de Cassis. |
| Share News Report | #Auto sector refinancing, lower #interrestrates will drive strong #corporatebond issuance, but volumes will likely fall short of last year's record highs. |
| Share Job Opportunity | Looking for a new career opportunity in logistics. If you know about something, please send me a message :-) #careeropportunity #logistics |
| Share Company Update | As lockdown measures are gradually eased it has gotten our team looking back at pre-COVID photos. Here is our team at our summary activity day. #Team #Summer |
| Share Achievement | We're proud to earn 100% on Human Rights Campaign's Corporate Equality Index for the ninth consecutive year. |

The intent labels that intent model 308 is trained to recognize can be configured according to a particular application. For example, the intent labels shown in Table 5 may be most suitable for a professional social network or job seeking application. Other intent labels can be used for other applications. Table 5 and the examples of data records shown in Table 5 are provided for illustration. This disclosure is not limited to these examples.

Label 2 feature set generator 316 includes a label 2 attribute aggregator 318. Label 2 attribute aggregator 318 performs the applicable aggregations on the features extracted from the content items of each copypasta cluster to create the second feature set as described above with reference to FIG. 2. For example, label 2 attribute aggregator 318 generates, for each copypasta cluster, a sum of all of the user reports submitted for all of the content items in the cluster. For instance, if a copypasta cluster contains five content items, one of the content items has been reported twice and another of the content items has been reported once, the user report count is three. As another example, label 2 attribute aggregator 318 generates, for each copypasta cluster, a count of the number of views of the original content item in the cluster. For instance, if the original content item in the cluster has three thousand views and the other content items in the cluster have a total of ten views, the original content item view count is three thousand.

In another example, label 2 attribute aggregator 318 generates, for each copypasta cluster, a count of the number of times a signal keyword is detected in comments of any of the content items in the cluster. For example, label 2 attribute aggregator 318 searches the text of the comments for keywords that match any of the signal keywords maintained in a database of signal keywords 320 and counts the number of matching keywords. For instance, if a copypasta cluster includes five content items and one of the content items in the cluster has a comment that contains the word "fake," and none of the other content items in the cluster contain any comments, the signal keyword count is one.

Signal keywords 320 is for example, a manually-curated or auto-generated searchable data structure that stores keywords and/or phrases that are signals of a specific type of intent. For example, signal keywords 320 can be curated to include only words that are associated with non-disruptive intents or only words that are associated with disruptive intents. In the illustrated implementations, signal keywords 320 includes keywords or phrases that are signals of disruptive intent, such as "fake," "copy," and "copypasta." Other signal keywords can be used for other applications and the set of signal keywords 320 can be expanded to include other keywords and/or phrases. Signal keywords 320 can be implemented using a table, a hierarchical or tree-based data structure or a graph data structure, for example. The described examples are provided for illustration. This disclosure is not limited to these examples.

Also in FIG. 3, copypasta classification system 146 includes a label 1 rules engine 324, a label 2 rules engine 332, copypasta model trainer 214, and a copypasta model 338.

Label 1 rules engine 324 applies the first set of filters described above with reference to FIG. 2 to the intent 1 feature sets 314 associated with the copypasta clusters 204. The first set of filters includes the filters that are designed to detect non-disruptive copypasta clusters. If the intent 1 feature set for a given copypasta cluster matches the conditions of any of the filters in the first filter set, then the copypasta is considered non-disruptive copypasta and assigned to intent 1 copypasta 328.

For example, if the author count in the intent 1 feature set for a copypasta cluster is one, and a first filter of the first set of filters determines whether copypasta clusters have an author count of exactly one, then the copypasta is assigned to intent 1 copypasta 328. If the cluster has an author count greater than one, the copypasta is assigned to possible intent 2 copypasta 330. As another example, if the organization count in the intent 1 feature set for a copypasta cluster is one, and a second filter of the first set of filters determines whether copypasta clusters have an organization count of exactly one, then the copypasta is assigned to intent 1 copypasta 328. If the cluster has an organization count greater than one, label 2 rules engine 324 assigns the copypasta to possible intent 2 copypasta 330. In another example, if the re-share count in the intent 1 feature set for a copypasta cluster is more than the threshold re-share count (e.g., fifty percent), and a third filter of the first set of filters determines whether copypasta clusters have a re-share count greater than the threshold re-share count, then the copypasta is assigned to intent 1 copypasta 328. If the cluster has a re-share count less than the threshold re-share count, the copypasta is assigned to possible intent 2 copypasta 330.

As another example, label 1 rules engine 324 compares the intent labels of the intent 1 feature set of a copypasta cluster, e.g., the intent labels generated by intent classification system 306, to a database of non-disruptive intents 326 to determine whether to assign the copypasta cluster to intent 1 copypasta 328 or possible intent 2 copypasta 330. For instance, if intent classification system 306 assigns a copypasta cluster an intent label of "Share Achievement" and the "Share Achievement" intent label is contained in non-disruptive intents 326, then the copypasta cluster is assigned to intent 1 copypasta 328. If intent classification system 306 assigns a copypasta cluster an intent label of "Not Found," then the copypasta cluster is assigned to possible intent 2 copypasta 330. If intent classification system 306 assigns a copypasta cluster an intent label of "Promote Product" and the "Promote Product" intent label is not contained in non-disruptive intents 326, then the copypasta cluster is assigned to possible intent 2 copypasta 330.

Non-disruptive intents 326 is for example, a manually-curated or auto-generated searchable data structure that identifies intent labels of intent ontology 312 that are signals of a non-disruptive intent. For example, non-disruptive intents 326 is curated to include only intent labels that are associated with non-disruptive intents. Other method of creating non-disruptive intents 326 can be used for other applications and the set of non-disruptive intents 326 can be modified as needed for a particular application. For instance, other types of intents can be included in non-disruptive intents 326 alternatively or in addition to those that are considered non-disruptive. Non-disruptive intents 326 can be implemented using a table, a hierarchical or tree-based data structure, or a graph data structure, for example. The described examples are provided for illustration. This disclosure is not limited to these examples.

Label 1 rules engine 324 makes intent 1 copypasta 328 available to an appropriate downstream action. For example, as shown in FIG. 3, intent 1 copypasta 328 is provided to copypasta model trainer 214. As shown in FIG. 2, intent 1 copypasta could be provided to, for example, content serving system 160 or content moderation system 150.

Label 1 rules engine 324 makes possible intent 2 copypasta 330 available to label 2 rules engine 332. Label 2 rules engine 332 applies the second set of filters described above with reference to FIG. 2 to the intent 2 feature sets 322 associated with the copypasta clusters 204. The second set of filters includes the filters that are designed to detect disruptive copypasta clusters. If the intent 2 feature set for a given copypasta cluster matches the conditions of any of the filters in the second filter set, then the copypasta is considered disruptive copypasta and assigned to intent 2 copypasta 334.

For example, if the user report count in the intent 2 feature set for a copypasta cluster is greater than the user report count threshold, and a first filter of the second set of filters determines whether copypasta clusters have a user report count greater than the user report threshold, then the copypasta is assigned to intent 2 copypasta 334. If the cluster has a user report count less than the user report count threshold, the copypasta remains labeled as possible intent 2 copypasta 330. As another example, if the original view count in the intent 2 feature set for a copypasta cluster is greater than the original view count threshold, and a second filter of the second set of filters determines whether copypasta clusters have an original view count greater than the original view count threshold, then the copypasta is assigned to intent 2 copypasta 334. If the cluster has an original view count less than the original view count threshold, the copypasta remains labeled as possible intent 2 copypasta 330. In another example, if the signal keyword count in the intent 2 feature set for a copypasta cluster is greater than the signal keyword threshold, and a third filter of the second set of filters determines whether copypasta clusters have a signal keyword count greater than the signal keyword count threshold, then the copypasta is assigned to intent 2 copypasta 334. If the cluster has a signal keyword count less than the signal keyword count threshold, the copypasta remains labeled as possible intent 2 copypasta 330.

Label 2 rules engine 332 makes intent 2 copypasta 334 available to an appropriate downstream action. For example, as shown in FIG. 3, intent 2 copypasta 334 is provided to copypasta model trainer 214. As shown in FIG. 2, intent 2 copypasta 334 could be provided to, for example, content serving system 160 or content moderation system 150. For example, intent 2 copypasta 334 could be removed from distribution by the online system through content serving system 160 or content moderation system 150. In contrast to intent 1 copypasta 328, intent 2 copypasta 334 is not permitted to continue distribution through the online system.

Label 2 rules engine 332 makes possible intent 2 copypasta 330 that has not been moved to intent 2 copypasta 334 available to an appropriate downstream action. For example, possible intent 2 copypasta 330 is provided to content serving system 160 or content moderation system 150. In contrast to intent 1 copypasta 328, possible intent 2 copypasta 330 is not permitted to continue distribution through the online system without first passing through either content serving system 160 or content moderation system 150. In contrast to intent 2 copypasta 344, the processing of possible intent 2 copypasta 330 by content serving system 160 or content moderation system 150 may permit possible intent 2 copypasta 330 to continue circulating through the online system.

Copypasta model trainer 212 uses intent 1 copypasta 328 and intent 2 copypasta 334 to create training data 336 and applies a machine learning algorithm to training data 336 using, e.g., supervised machine learning, to produce a trained copypasta model 338. To create "non-disruptive" examples of training data 336, copypasta model trainer 214 retrieves the intent 1 feature sets associated with the intent 1 copypasta 328 and adds label 1 (e.g., "non-disruptive") to each instance of the feature set. Similarly, to create "disruptive" examples of training data 338, copypasta model trainer 214 retrieves the intent 2 feature sets associated with the intent 2 copypasta 334 and adds label 2 (e.g., "disruptive") to each instance of the feature set. Copypasta model trainer 214 can supplement the intent 1 feature set and/or the intent 2 feature set with one or more additional features, such as a text embedding of the copypasta text or an image embedding of an image contained in the copypasta content item. Alternatively or in addition, copypasta model trainer 214 can use manually labeled training data to train copypasta model 338.

The trained copypasta model 338 can be used alone or in combination with the label 1 rules engine 324 and label 2 rules engine 332 to filter copypasta. For example, for a given copypasta cluster, the intent 1 feature set 314 can be combined with the intent 2 feature set 322, e.g., by concatenation or other combination function, and the combined feature sets 314, 322 can be input to the trained copypasta model 338 for the copypasta model 338 to output a label for the copypasta cluster, e.g., either label 1 or label 2.

Although not specifically shown in the drawings, in various implementations, one or more elements shown in FIG. 1 can be used in combination with aspects shown in FIG. 2 or FIG. 3, one or more elements shown in FIG. 2 can be used in combination with aspects shown in FIG. 1 or FIG. 3, and one or more elements shown in FIG. 3 can be used in combination with aspects shown in FIG. 1 or FIG. 2.

FIG. 5 is a flow diagram of an example method 500 for filtering copypasta in accordance with some embodiments of the present disclosure.

The method 500 is performed by processing logic that includes hardware (e.g., processing device, circuitry, dedicated logic, programmable logic, microcode, hardware of a device, integrated circuit, etc.), software (e.g., instructions run or executed on a processing device), or a combination thereof. In some embodiments, the method 500 is performed by portions of copypasta filtering system 140 of FIG. 1. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, at least one process can be omitted in various embodiments. Thus, not all processes are required in every embodiment. Other process flows are possible.

At operation 502, the processing device clusters digital content items distributed by an online system into copypasta clusters. Examples of digital content items include posts and reshares made by users of a social networking system or messaging system. A copypasta cluster contains content items having similar content, such as the same text. Operation 502 is performed, for example, by cluster generator 142, described above with reference to FIG. 1 and FIG. 2. Examples of copypasta clusters are shown in FIG. 4A, FIG. 4B, and FIG. 4C, described above.

At operation 504, the processing device extracts a first feature set from the digital content items in the copypasta clusters produced at operation 502. Operation 504 is performed, for example, by feature generator 144, described above with reference to FIG. 1, FIG. 2, and FIG. 3. In some implementations, operation 504 includes extracting first attribute data from content items within a copypasta cluster. The attribute data included in the first attribute data are configurable according to the requirements of a particular application. In some implementations, the first attribute data includes at least one of the following types of attribute data: a count of authors of the content items within the copypasta cluster, a count of organizations associated with the authors of the content items within the copypasta cluster, a count of the content items within the copypasta cluster that are re-shares of an original content item within the copypasta cluster; and/or intent labels output by an intent model for the content items within the copypasta cluster.

At operation 506, the processing device applies a first set of filters to the first feature set to divide the copypasta clusters into first intent copypasta clusters and possible second intent copypasta clusters. Operation 506 is performed, for example, by copypasta classification system 146, described above with reference to FIG. 1, FIG. 2, and FIG. 3. The filters in the first set of filters are configurable based on the requirements of a particular application. In some implementations, operation 506 uses a first set of filters that includes at least one of the following types of filters: a first filter that associates copypasta clusters that have an author count equal to an author count threshold with the first intent copypasta clusters, a second filter that associates copypasta clusters that have an organization count equal to an organization count threshold with the first intent copypasta clusters, a third filter that associates copypasta clusters that have a re-share count equal to a re-share count threshold with the first intent copypasta clusters, and a fourth filter that associates copypasta clusters that have intent labels in a set of approved intent labels with the first intent copypasta clusters.

At operation 508, the processing device extracts a second feature set from the digital content items in the possible second intent copypasta clusters. Operation 508 is performed, for example, by feature generator 144, described above with reference to FIG. 1, FIG. 2, and FIG. 3. In some implementations, operation 508 includes extracting second attribute data from content items within a copypasta cluster. The attribute data included in the second attribute data are configurable according to the requirements of a particular application. In some implementations, the second attribute data includes at least one of the following types of attribute data: a count of the content items within the copypasta cluster that have an associated user-submitted report, a count of views of an original content item within the copypasta cluster, and a count of signal keywords in comments associated with the content items within the copypasta cluster. In some implementations, operation 508 is combined with operation 504 such that both the first feature set and the second feature set are generated from the copypasta clusters at operation 504.

At operation 510, the processing device applies a second set of filters different from the first set of filters to the second feature set to create second intent copypasta clusters. Operation 506 is performed, for example, by copypasta classification system 146, described above with reference to FIG. 1, FIG. 2, and FIG. 3. The filters in the first set of filters are configurable based on the requirements of a particular application. In some implementations, operation 510 uses a second set of filters that includes at least one of the following types of filters: a first filter that moves, from the possible second intent copypasta clusters to the second intent copypasta clusters, copypasta clusters that have a user-submitted report count greater than a user-submitted report threshold, a second filter that moves, from the possible second intent copypasta clusters to the second intent copypasta clusters, copypasta clusters that have a signal keyword count greater than a signal keyword count threshold, and a third filter that moves, from the possible second intent copypasta clusters to the second intent copypasta clusters, copypasta clusters that have an original view count greater than an original view count threshold.

At operation 512, the processing device executes a first downstream action on the first intent copypasta clusters. Operation 512 is performed, for example, by copypasta filtering system 140, application software system 130, content serving system 160, content moderation system 150, or copypasta model trainer 214, described above with reference to FIG. 1, FIG. 2, and FIG. 3. The first downstream action is configurable based on the requirements of a particular implementation. For example, in some implementations, operation 512 includes executing at least one of the following actions: labeling the first intent copypasta clusters with a first intent label, distributing content items in the first intent copypasta clusters to a first portion of the online system based on the first intent label, creating training data including the first intent copypasta clusters labeled with the first intent label, training a machine learning model based on the training data, and/or scoring content items in the first intent copypasta clusters based on the first intent label.

At operation 514, the processing device executes a second downstream action different from the first downstream action on the second intent copypasta clusters. Operation 514 is performed, for example, by copypasta filtering system 140, application software system 130, content serving system 160, content moderation system 150, or copypasta model trainer 214, described above with reference to FIG. 1, FIG. 2, and FIG. 3. The second downstream action is configurable based on the requirements of a particular implementation. In some implementations, operation 512 includes executing at least one of the following actions: labeling the second intent copypasta clusters with a second intent label different from the first intent label, distributing content items in the second intent copypasta clusters to a second portion of the online system different from the first portion of the online system based on the second intent label, creating training data including the second intent copypasta clusters labeled with the second intent label, training a machine learning model based on the training data, scoring content items in the second intent copypasta clusters based on the second intent label, and/or sending the second intent copypasta clusters to a content moderation system.

FIG. 6 is a block diagram of an example computer system 600 including a copypasta filtering system 650 in accordance with some embodiments of the present disclosure. The copypasta filtering system 650 includes portions of copypasta filtering system.

In FIG. 6, an example machine of a computer system 600 is shown, within which a set of instructions, for causing the machine to perform any of the methodologies discussed herein, can be executed. In some embodiments, the computer system 600 can correspond to a component of a networked computer system (e.g., as a component of the computer system 100 of FIG. 1) that includes, is coupled to, or utilizes a machine to execute an operating system to perform operations corresponding to portions of the copypasta filtering system 140 of FIG. 1. For example, computer system 600 corresponds to a portion of computing system when the computing system is executing a portion of copypasta filtering system 140.

The machine is connected (e.g., networked) to other machines in a local area network (LAN), an intranet, an extranet, and/or the Internet. The machine can operate in the capacity of a server or a client machine in a client-server network environment, as a peer machine in a peer-to-peer (or distributed) network environment, or as a server or a client machine in a cloud computing infrastructure or environment.

The machine is a personal computer (PC), a smart phone, a tablet PC, a set-top box (STB), a Personal Digital Assistant (PDA), a cellular telephone, a web appliance, a wearable device, a server, or any machine capable of executing a set of instructions (sequential or otherwise) that specify actions to be taken by that machine. Further, while a single machine is illustrated, the term "machine" includes any collection of machines that individually or jointly execute a set (or multiple sets) of instructions to perform any of the methodologies discussed herein.

The example computer system 600 includes a processing device 602, a main memory 604 (e.g., read-only memory (ROM), flash memory, dynamic random access memory (DRAM) such as synchronous DRAM (SDRAM) or Rambus DRAM (RDRAM), etc.), a memory 606 (e.g., flash memory, static random access memory (SRAM), etc.), an input/output system 610, and a data storage system 640, which communicate with each other via a bus 630.

Processing device 602 represents at least one general-purpose processing device such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 602 can also be at least one special-purpose processing device such as an application specific integrated circuit (ASIC), a field programmable gate array (FPGA), a digital signal processor (DSP), network processor, or the like. The processing device 602 is configured to execute instructions 612 for performing the operations and steps discussed herein.

In FIG. 6, copypasta filtering system 650 represents portions of copypasta filtering system 140 when the computer system 600 is executing those portions of copypasta filtering system 140. Instructions 612 include portions of copypasta filtering system 650 when those portions of the copypasta filtering system 650 are being executed by processing device 602. Thus, the copypasta filtering system 650 is shown in dashed lines as part of instructions 612 to illustrate that, at times, portions of the copypasta filtering system 650 are executed by processing device 602. For example, when at least some portion of the copypasta filtering system 650 is embodied in instructions to cause processing device 602 to perform the method(s) described above, some of those instructions can be read into processing device 602 (e.g., into an internal cache or other memory) from main memory 604 and/or data storage system 640. However, it is not required that all of the copypasta filtering system 650 be included in instructions 612 at the same time and portions of the copypasta filtering system 650 are stored in at least one other component of computer system 600 at other times, e.g., when at least one portion of the copypasta filtering system 650 are not being executed by processing device 602.

The computer system 600 further includes a network interface device 608 to communicate over the network 620. Network interface device 608 provides a two-way data communication coupling to a network. For example, network interface device 608 can be an integrated-services digital network (ISDN) card, cable modem, satellite modem, or a modem to provide a data communication connection to a corresponding type of telephone line. As another example, network interface device 608 can be a local area network (LAN) card to provide a data communication connection to a compatible LAN. Wireless links can also be implemented. In any such implementation network interface device 608 can send and receives electrical, electromagnetic, or optical signals that carry digital data streams representing various types of information.

The network link can provide data communication through at least one network to other data devices. For example, a network link can provide a connection to the world-wide packet data communication network commonly referred to as the "Internet," for example through a local network to a host computer or to data equipment operated by an Internet Service Provider (ISP). Local networks and the Internet use electrical, electromagnetic, or optical signals that carry digital data to and from computer system computer system 600.

Computer system 600 can send messages and receive data, including program code, through the network(s) and network interface device 608. In the Internet example, a server can transmit a requested code for an application program through the Internet and network interface device 608. The received code can be executed by processing device 602 as it is received, and/or stored in data storage system 640, or other non-volatile storage for later execution.

The input/output system 610 includes an output device, such as a display, for example a liquid crystal display (LCD) or a touchscreen display, for displaying information to a computer user, or a speaker, a haptic device, or another form of output device. The input/output system 610 can include an input device, for example, alphanumeric keys and other keys configured for communicating information and command selections to processing device 602. An input device can, alternatively or in addition, include a cursor control, such as a mouse, a trackball, or cursor direction keys for communicating direction information and command selections to processing device 602 and for controlling cursor movement on a display. An input device can, alternatively or in addition, include a microphone, a sensor, or an array of sensors, for communicating sensed information to processing device 602. Sensed information can include voice commands, audio signals, geographic location information, and/or digital imagery, for example.

The data storage system 640 includes a machine-readable storage medium 642 (also known as a computer-readable medium) on which is stored at least one set of instructions 644 or software embodying any of the methodologies or functions described herein. The instructions 644 can also reside, completely or at least partially, within the main memory 604 and/or within the processing device 602 during execution thereof by the computer system 600, the main memory 604 and the processing device 602 also constituting machine-readable storage media.

In one embodiment, the instructions 644 include instructions to implement functionality corresponding to a copypasta filtering system (e.g., the copypasta filtering system 140 of FIG. 1).

Dashed lines are used in FIG. 6 to indicate that it is not required that the copypasta filtering system be embodied entirely in instructions 612, 614, and 644 at the same time. In one example, portions of the copypasta filtering system are embodied in instructions 644, which are read into main memory 604 as instructions 614, and portions of instructions 614 are read into processing device 602 as instructions 612 for execution. In another example, some portions of the copypasta filtering system are embodied in instructions 644 while other portions are embodied in instructions 614 and still other portions are embodied in instructions 612.

While the machine-readable storage medium 642 is shown in an example embodiment to be a single medium, the term "machine-readable storage medium" should be taken to include a single medium or multiple media that store the at least one set of instructions. The term "machine-readable storage medium" shall also be taken to include any medium that is capable of storing or encoding a set of instructions for execution by the machine and that cause the machine to perform any of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to convey the substance of their work most effectively to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, which manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general-purpose computer selectively activated or reconfigured by a computer program stored in the computer. For example, a computer system or other data processing system, such as the computing system 100, can carry out the above-described computer-implemented methods 200, 300, 500 in response to its processor executing a computer program (e.g., a sequence of instructions) contained in a memory or other non-transitory machine-readable storage medium. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general-purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, which can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

Illustrative examples of the technologies disclosed herein are provided below. An embodiment of the technologies may include any of the examples or a combination of the described below.

In an example 1, a method includes clustering digital content items distributed by an online system into copypasta clusters, extracting a first feature set from the digital content items in the copypasta clusters, applying a first set of filters to the first feature set, based on output of the first set of filters, dividing the copypasta clusters into first intent copypasta clusters and possible second intent copypasta clusters, extracting a second feature set from the digital content items in the possible second intent copypasta clusters, applying a second set of filters different from the first set of filters to the second feature set, based on output of the second set of filters, creating second intent copypasta clusters, executing a first downstream action on the first intent copypasta clusters, and executing a second downstream action different from the first downstream action on the second intent copypasta clusters.

An example 2 includes the subject matter of example 1, where executing the first downstream action includes labeling the first intent copypasta clusters with a first intent label, and based on the first intent label, distributing content items in the first intent copypasta clusters to a first portion of the online system. An example 3 includes the subject matter of example 2, where executing the second downstream action includes labeling the second intent copypasta clusters with a second intent label different from the first intent label, and based on the second intent label, distributing content items in the second intent copypasta clusters to a second portion of the online system different from the first portion of the online system. An example 4 includes the subject matter of any of examples 1-3, where executing the first downstream action includes labeling the first intent copypasta clusters with a first intent label, executing the second downstream action includes labeling the second intent copypasta clusters with a second intent label different from the first intent label; and the method further includes creating training data including the first intent copypasta clusters labeled with the first intent label and the second intent copypasta clusters labeled with the second intent label, and training a machine learning model based on the training data. An example 5 includes the subject matter of any of examples 1-4, where executing the first downstream action includes labeling the first intent copypasta clusters with a first intent label, and scoring content items in the first intent copypasta clusters based on the first intent label, and executing the second downstream action includes labeling the second intent copypasta clusters with a second intent label different from the first intent label, and (ii) scoring content items in the second intent copypasta clusters based on the second intent label. An example 6 includes the subject matter of any of examples 1-5, where executing the second downstream action includes sending the second intent copypasta clusters to a content moderation system. An example 7 includes the subject matter of any of examples 1-5, where extracting the first feature set includes extracting first attribute data from content items within a copypasta cluster; and the first attribute data includes at least one of a count of authors of the content items within the copypasta cluster, a count of organizations associated with the authors of the content items within the copypasta cluster, a count of the content items within the copypasta cluster that are re-shares of an original content item within the copypasta cluster, or intent labels output by an intent model for the content items within the copypasta cluster. An example 8 includes the subject matter of any of examples 1-7, where the first set of filters includes at least one of a first filter that associates copypasta clusters that have an author count equal to an author count threshold with the first intent copypasta clusters, a second filter that associates copypasta clusters that have an organization count equal to an organization count threshold with the first intent copypasta clusters, a third filter that associates copypasta clusters that have a re-share count equal to a re-share count threshold with the first intent copypasta clusters, or a fourth filter that associates copypasta clusters that have intent labels in a set of approved intent labels with the first intent copypasta clusters. An example 9 includes the subject matter of any of examples 1-8, where extracting the second feature set includes extracting second attribute data from content items within a copypasta cluster, and the second attribute data includes at least one of a count of the content items within the copypasta cluster that have an associated user-submitted report, a count of views of an original content item within the copypasta cluster, or a count of signal keywords in comments associated with the content items within the copypasta cluster. An example 10 includes the subject matter of any of examples 1-9, where the second set of filters includes at least one of a first filter that moves, from the possible second intent copypasta clusters to the second intent copypasta clusters, copypasta clusters that have a user-submitted report count greater than a user-submitted report threshold, a second filter that moves, from the possible second intent copypasta clusters to the second intent copypasta clusters, copypasta clusters that have a signal keyword count greater than a signal keyword count threshold, or a third filter that moves, from the possible second intent copypasta clusters to the second intent copypasta clusters, copypasta clusters that have an original view count greater than an original view count threshold.

In an example 11, a system includes at least one processor, at least one memory coupled to the at least one processor, the at least one memory includes instructions that when executed by the at least one process, cause the at least one processor to perform operations including using a first set of filters, dividing copypasta clusters into first intent copypasta clusters and possible second intent copypasta clusters, applying a second set of filters to the possible second intent copypasta clusters, based on output of the second set of filters, creating second intent copypasta clusters, executing a first downstream action on the first intent copypasta clusters, and executing a second downstream action different from the first downstream action on the second intent copypasta clusters.

An example 12 includes the subject matter of example 11, where the instructions, when executed by the at least one processor, cause the at least one processor to perform operations further including extracting a first feature set from digital content items in the copypasta clusters, applying the first set of filters to the first feature set, extracting a second feature set from digital content items in the possible second intent copypasta clusters, and applying the second set of filters to the second feature set. An example 13 includes the subject matter of example 11 or example 12, where the instructions, when executed by the at least one processor, cause the at least one processor to perform operations further including extracting first attribute data from content items within a copypasta cluster, where the first attribute data includes at least one of a count of authors of the content items within the copypasta cluster, a count of organizations associated with the authors of the content items within the copypasta cluster, a count of the content items within the copypasta cluster that are re-shares of an original content item within the copypasta cluster, or intent labels output by an intent model for the content items within the copypasta cluster. An example 14 includes the subject matter of any of examples 11-13, where the first set of filters includes at least one of a first filter that associates copypasta clusters that have an author count equal to an author count threshold with the first intent copypasta clusters, a second filter that associates copypasta clusters that have an organization count equal to an organization count threshold with the first intent copypasta clusters, a third filter that associates copypasta clusters that have a re-share count equal to a re-share count threshold with the first intent copypasta clusters, or a fourth filter that associates copypasta clusters that have intent labels in a set of approved intent labels with the first intent copypasta clusters. An example 15 includes the subject matter of any of examples 11-14, where the instructions, when executed by the at least one processor, cause the at least one processor to perform operations further including extracting second attribute data from content items within a copypasta cluster, where the second attribute data includes at least one of a count of the content items within the copypasta cluster that have an associated user-submitted report, a count of views of an original content item within the copypasta cluster, or a count of signal keywords in comments associated with the content items within the copypasta cluster. An example 16 includes the subject matter of any of examples 11-15, where the second set of filters includes at least one of a first filter that moves, from the possible second intent copypasta clusters to the second intent copypasta clusters, copypasta clusters that have a user-submitted report count greater than a user-submitted report threshold, a second filter that moves, from the possible second intent copypasta clusters to the second intent copypasta clusters, copypasta clusters that have a signal keyword count greater than a signal keyword count threshold, or a third filter that moves, from the possible second intent copypasta clusters to the second intent copypasta clusters, copypasta clusters that have an original view count greater than an original view count threshold. An example 17 includes the subject matter of any of examples 11-16, where executing the first downstream action includes labeling the first intent copypasta clusters with a first intent label, and based on the first intent label, distributing content items in the first intent copypasta clusters to a first portion of an online system, and executing the second downstream action includes labeling the second intent copypasta clusters with a second intent label different from the first intent label, and based on the second intent label, distributing content items in the second intent copypasta clusters to a second portion of the online system different from the first portion of the online system. An example 18 includes the subject matter of any of examples 11-17, where executing the first downstream action includes labeling the first intent copypasta clusters with a first intent label, executing the second downstream action includes labeling the second intent copypasta clusters with a second intent label different from the first intent label, and the instructions, when executed by the at least one processor, cause the at least one processor to perform operations further including (a) creating training data including the first intent copypasta clusters labeled with the first intent label and the second intent copypasta clusters labeled with the second intent label, and (b) using the training data, training a machine learning model to classify copypasta clusters. An example 19 includes the subject matter of any of examples 11-18, where executing the first downstream action includes labeling the first intent copypasta clusters with a first intent label, and scoring content items in the first intent copypasta clusters based on the first intent label, and executing the second downstream action includes labeling the second intent copypasta clusters with a second intent label different from the first intent label, and scoring content items in the second intent copypasta clusters based on the second intent label. An example 20 includes the subject matter of any of examples 11-19, where executing the second downstream action includes sending the second intent copypasta clusters to a content moderation system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:
    clustering digital content items distributed by an online system into copypasta clusters;
    extracting a first feature set from the digital content items in the copypasta clusters;
    applying a first set of filters to the first feature set;
    based on output of the first set of filters, dividing the copypasta clusters into first intent copypasta clusters and second intent copypasta clusters;
    extracting a second feature set from the digital content items in the second intent copypasta clusters;
    applying a second set of filters different from the first set of filters to the second feature set;
    based on output of the second set of filters, creating third intent copypasta clusters;
    executing a first downstream action on the first intent copypasta clusters, wherein the first downstream action comprises allowing distribution of the first intent copypasta clusters through the online system; and
    executing a second downstream action different from the first downstream action on the third intent copypasta clusters.

2. The method of claim 1, wherein executing the first downstream action comprises:
    labeling the first intent copypasta clusters with a first intent label; and
    based on the first intent label, distributing content items in the first intent copypasta clusters to a first portion of the online system.

3. The method of claim 2, wherein executing the second downstream action comprises:
    labeling the third intent copypasta clusters with a second intent label different from the first intent label; and
    based on the second intent label, distributing content items in the third intent copypasta clusters to a second portion of the online system different from the first portion of the online system.

4. The method of claim 1, wherein:
    executing the first downstream action comprises labeling the first intent copypasta clusters with a first intent label;
    executing the second downstream action comprises labeling the third intent copypasta clusters with a second intent label different from the first intent label; and
    the method further comprises creating training data comprising the first intent copypasta clusters labeled with the first intent label and the third intent copypasta clusters labeled with the second intent label, and training a machine learning model based on the training data.

5. The method of claim 1, wherein:
    executing the first downstream action comprises labeling the first intent copypasta clusters with a first intent label, and scoring content items in the first intent copypasta clusters based on the first intent label; and
    executing the second downstream action comprises labeling the third intent copypasta clusters with a second intent label different from the first intent label, and (ii) scoring content items in the third intent copypasta clusters based on the second intent label.

6. The method of claim 1, wherein executing the second downstream action comprises sending the third intent copypasta clusters to a content moderation system.

7. The method of claim 1, wherein:
    (i) extracting the first feature set comprises extracting first attribute data from content items within a copypasta cluster; and
    (ii) the first attribute data comprises at least one of:
        a count of authors of the content items within the copypasta cluster;
        a count of organizations associated with the authors of the content items within the copypasta cluster;
        a count of the content items within the copypasta cluster that are re-shares of an original content item within the copypasta cluster; or
        intent labels output by an intent model for the content items within the copypasta cluster.

8. The method of claim 1, wherein the first set of filters comprises at least one of:
    a first filter that associates copypasta clusters that have an author count equal to an author count threshold with the first intent copypasta clusters;
    a second filter that associates copypasta clusters that have an organization count equal to an organization count threshold with the first intent copypasta clusters;
    a third filter that associates copypasta clusters that have a re-share count equal to a re-share count threshold with the first intent copypasta clusters; or
    a fourth filter that associates copypasta clusters that have intent labels in a set of approved intent labels with the first intent copypasta clusters.

9. The method of claim 1, wherein:
    (i) extracting the second feature set comprises extracting second attribute data from content items within a copypasta cluster; and
    (ii) the second attribute data comprises at least one of:
        a count of the content items within the copypasta cluster that have an associated user-submitted report;
        a count of views of an original content item within the copypasta cluster; or
        a count of signal keywords in comments associated with the content items within the copypasta cluster.

10. The method of claim 1, wherein the second set of filters comprises at least one of:
    a first filter that moves, from the second intent copypasta clusters to the third intent copypasta clusters, copypasta clusters that have a user-submitted report count greater than a user-submitted report threshold;
    a second filter that moves, from the second intent copypasta clusters to the third intent copypasta clusters, copypasta clusters that have a signal keyword count greater than a signal keyword count threshold; or
    a third filter that moves, from the second intent copypasta clusters to the third intent copypasta clusters, copypasta clusters that have an original view count greater than an original view count threshold.

11. A system comprising:
    at least one processor;
    at least one memory coupled to the at least one processor;
    the at least one memory comprises instructions that when executed by the at least one processor, cause the at least one processor to perform operations comprising:

using a first set of filters, dividing copypasta clusters into first intent copypasta clusters and second intent copypasta clusters;

applying a second set of filters to the second intent copypasta clusters;

based on output of the second set of filters, creating third intent copypasta clusters;

executing a first downstream action on the first intent copypasta clusters, wherein the first downstream action comprises allowing distribution of the first intent copypasta clusters through an online system; and executing a second downstream action different from the first downstream action on the third intent copypasta clusters.

12. The system of claim 11, wherein the instructions, when executed by the at least one processor, cause the at least one processor to perform operations further comprising:

extracting a first feature set from digital content items in the copypasta clusters;

applying the first set of filters to the first feature set;

extracting a second feature set from digital content items in the second intent copypasta clusters; and applying the second set of filters to the second feature set.

13. The system of claim 11, wherein the instructions, when executed by the at least one processor, cause the at least one processor to perform operations further comprising:

extracting first attribute data from content items within a copypasta cluster, wherein the first attribute data comprises at least one of:
  a count of authors of the content items within the copypasta cluster;
  a count of organizations associated with the authors of the content items within the copypasta cluster;
  a count of the content items within the copypasta cluster that are re-shares of an original content item within the copypasta cluster; or
  intent labels output by an intent model for the content items within the copypasta cluster.

14. The system of claim 11, wherein the first set of filters comprises at least one of:
  a first filter that associates copypasta clusters that have an author count equal to an author count threshold with the first intent copypasta clusters;
  a second filter that associates copypasta clusters that have an organization count equal to an organization count threshold with the first intent copypasta clusters;
  a third filter that associates copypasta clusters that have a re-share count equal to a re-share count threshold with the first intent copypasta clusters; or
  a fourth filter that associates copypasta clusters that have intent labels in a set of approved intent labels with the first intent copypasta clusters.

15. The system of claim 11, wherein the instructions, when executed by the at least one processor, cause the at least one processor to perform operations further comprising:

extracting second attribute data from content items within a copypasta cluster, wherein the second attribute data comprises at least one of:
  a count of the content items within the copypasta cluster that have an associated user-submitted report;
  a count of views of an original content item within the copypasta cluster; or
  a count of signal keywords in comments associated with the content items within the copypasta cluster.

16. The system of claim 11, wherein the second set of filters comprises at least one of:
  a first filter that moves, from the second intent copypasta clusters to the third intent copypasta clusters, copypasta clusters that have a user-submitted report count greater than a user-submitted report threshold;
  a second filter that moves, from the second intent copypasta clusters to the third intent copypasta clusters, copypasta clusters that have a signal keyword count greater than a signal keyword count threshold; or
  a third filter that moves, from the second intent copypasta clusters to the third intent copypasta clusters, copypasta clusters that have an original view count greater than an original view count threshold.

17. The system of claim 11, wherein;

executing the first downstream action comprises:

labeling the first intent copypasta clusters with a first intent label; and based on the first intent label, distributing content items in the first intent copypasta clusters to a first portion of an online system; and executing the second downstream action comprises:

labeling the third intent copypasta clusters with a second intent label different from the first intent label; and based on the second intent label, distributing content items in the third intent copypasta clusters to a second portion of the online system different from the first portion of the online system.

18. The system of claim 11, wherein:

executing the first downstream action comprises labeling the first intent copypasta clusters with a first intent label;

executing the second downstream action comprises labeling the third intent copypasta clusters with a second intent label different from the first intent label; and the instructions, when executed by the at least one processor, cause the at least one processor to perform operations further comprising (a) creating training data comprising the first intent copypasta clusters labeled with the first intent label and the third intent copypasta clusters labeled with the second intent label, and (b) using the training data, training a machine learning model to classify copypasta clusters.

19. The system of claim 11, wherein:

executing the first downstream action comprises labeling the first intent copypasta clusters with a first intent label, and scoring content items in the first intent copypasta clusters based on the first intent label; and executing the second downstream action comprises labeling the third intent copypasta clusters with a second intent label different from the first intent label, and scoring content items in the third intent copypasta clusters based on the second intent label.

20. The system of claim 11, wherein executing the third downstream action comprises sending the second intent copypasta clusters to a content moderation system.

* * * * *